(12) United States Patent
Shaughnessy et al.

(10) Patent No.: US 12,377,801 B2
(45) Date of Patent: Aug. 5, 2025

(54) AUTOMATIC VEHICLE CONTROL

(71) Applicant: Polaris Industries Inc., Medina, MN (US)

(72) Inventors: Aidan B. Shaughnessy, Madison, AL (US); Robert Be Puckette, Brush Prairie, WA (US); Steven B. Elgee, Portland, OR (US); Timothy P. Norstad, Turtle Lake, WI (US); Carl A. Turner, Portland, OR (US); Brenden D. Bungert, Chisago City, MN (US); Jacob P. Horky, Shoreview, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 17/866,927

(22) Filed: Jul. 18, 2022

(65) Prior Publication Data

US 2023/0024039 A1 Jan. 26, 2023

Related U.S. Application Data

(60) Provisional application No. 63/223,863, filed on Jul. 20, 2021.

(51) Int. Cl.
*B60K 37/06* (2006.01)
*B60K 20/02* (2006.01)
(Continued)

(52) U.S. Cl.
CPC .............. *B60K 35/10* (2024.01); *B60K 20/02* (2013.01); *B60K 26/02* (2013.01);
(Continued)

(58) Field of Classification Search
CPC ........ B60K 37/06; B60K 20/02; B60K 26/02; B60K 2026/029; B60R 16/0231;
(Continued)

(56) References Cited

U.S. PATENT DOCUMENTS 4,937,749 A * 6/1990 Dunkley ............. F16H 61/0213
 701/52
5,555,503 A * 9/1996 Kyrtsos .................. G08G 1/202
 701/518
(Continued)

FOREIGN PATENT DOCUMENTS

CN 105480094 A 4/2016
CN 107850895 A 3/2018
(Continued)

*Primary Examiner* — Logan M Kraft
*Assistant Examiner* — John D Bailey
(74) *Attorney, Agent, or Firm* — Merchant & Gould, P.C.

(57) ABSTRACT

Techniques for automatic control of a vehicle are disclosed. The vehicle may include a removable input device having various modes of operation. For example, a coupled mode of operation may control the vehicle when an operator is in an operator area of the vehicle, while a remote mode of operation may enable vehicle control when the operator is outside of the operator area. The vehicle may include object sensors to detect a target such as the removable input device or an operator device. Accordingly, the vehicle may automatically follow the target. The vehicle may also identify obstacles, in response to which manual control of the vehicle may at least temporarily be provided to the operator, after which automatic control may resume.

20 Claims, 16 Drawing Sheets

(51) Int. Cl.
*B60K 26/02* (2006.01)
*B60K 35/10* (2024.01)
*B60R 16/023* (2006.01)
*B60R 16/033* (2006.01)
*B60W 30/09* (2012.01)

(52) U.S. Cl.
CPC ........ *B60R 16/0231* (2013.01); *B60R 16/033* (2013.01); *B60W 30/09* (2013.01); *B60K 2026/029* (2013.01); *B60W 2420/403* (2013.01); *B60W 2540/10* (2013.01); *B60W 2540/12* (2013.01); *B60W 2540/18* (2013.01)

(58) Field of Classification Search
CPC . B60R 16/033; B60W 30/09; B60W 2420/42; B60W 2540/10; B60W 2540/12; B60W 2540/18
USPC .......................................................... 701/19
See application file for complete search history.

(56) References Cited

U.S. PATENT DOCUMENTS

| | | | | |
|---|---|---|---|---|
| 5,612,883 | A * | 3/1997 | Shaffer | G05D 1/0278 702/159 |
| 5,640,323 | A * | 6/1997 | Kleimenhagen | G05D 1/0242 701/1 |
| 5,650,928 | A * | 7/1997 | Hagenbuch | G01S 1/70 701/1 |
| 5,692,735 | A * | 12/1997 | Aho | B66D 1/08 254/323 |
| 8,639,400 | B1 * | 1/2014 | Wong | A63H 27/12 701/16 |
| 8,892,276 | B1 * | 11/2014 | Young | A63H 19/24 701/19 |
| 9,026,284 | B2 * | 5/2015 | Kumar | B61L 17/00 701/19 |
| 9,797,247 | B1 * | 10/2017 | Nelson | E21F 13/02 |
| 10,058,031 | B1 * | 8/2018 | Brown | B60K 7/0007 |
| 11,046,332 | B2 * | 6/2021 | Akaba | B60W 10/20 |
| 2002/0003571 | A1 * | 1/2002 | Schofield | B60K 35/28 348/148 |
| 2004/0083035 | A1 * | 4/2004 | Ellis | A61H 3/068 701/1 |
| 2007/0050095 | A1 * | 3/2007 | Nelson | B60R 16/0231 701/1 |
| 2007/0057781 | A1 * | 3/2007 | Breed | B60K 35/22 340/457.1 |
| 2007/0144799 | A1 * | 6/2007 | Vasant | B60K 35/10 180/65.1 |
| 2009/0085368 | A1 * | 4/2009 | Coffelt | F41G 3/22 296/70 |
| 2010/0063680 | A1 * | 3/2010 | Tolstedt | G05D 1/0214 701/1 |
| 2011/0066343 | A1 * | 3/2011 | Ota | B60W 50/14 701/70 |
| 2011/0162896 | A1 * | 7/2011 | Gillett | B60N 2/02246 180/2.2 |
| 2014/0067215 | A1 * | 3/2014 | Wetterlund | G06F 17/00 701/69 |
| 2014/0350767 | A1 * | 11/2014 | Fries | B61L 25/021 701/119 |
| 2015/0024688 | A1 * | 1/2015 | Hrabak | H04W 4/80 455/41.2 |
| 2015/0060185 | A1 * | 3/2015 | Feguri | B62D 5/003 180/333 |
| 2015/0107552 | A1 * | 4/2015 | Yun | B60K 35/80 123/319 |
| 2015/0360626 | A1 * | 12/2015 | O'Donnell | E02F 3/961 172/35 |
| 2016/0046468 | A1 * | 2/2016 | Heravi | B66D 1/54 715/835 |
| 2016/0098096 | A1 * | 4/2016 | Averill | B66D 1/46 345/184 |
| 2017/0023127 | A1 * | 1/2017 | Greasamar | E01H 5/061 |
| 2018/0056985 | A1 * | 3/2018 | Coulter | B62K 5/007 |
| 2018/0092285 | A1 * | 4/2018 | Centerbar | A01B 59/062 |
| 2018/0101998 | A1 * | 4/2018 | Pierce | G06F 16/24565 |
| 2018/0170726 | A1 * | 6/2018 | August | B66D 1/46 |
| 2018/0202539 | A1 * | 7/2018 | Shibata | B60K 35/10 |
| 2019/0049941 | A1 * | 2/2019 | Michalakis | B60W 60/0059 |
| 2019/0112168 | A1 * | 4/2019 | Hall | B66D 1/225 |
| 2019/0118792 | A1 * | 4/2019 | Malone | G05D 1/2265 |
| 2019/0233262 | A1 * | 8/2019 | Huang | B66D 1/12 |
| 2019/0354098 | A1 * | 11/2019 | Kreiling | G05D 1/0022 |
| 2019/0382005 | A1 * | 12/2019 | Nishi | A01B 69/001 |
| 2019/0390441 | A1 * | 12/2019 | Storey | G05B 19/042 |
| 2020/0062308 | A1 * | 2/2020 | Kim | G06V 20/586 |
| 2020/0079361 | A1 * | 3/2020 | Suzuki | B60W 30/06 |
| 2020/0198561 | A1 * | 6/2020 | Weed | B60R 16/03 |
| 2020/0199850 | A1 * | 6/2020 | Oasa | F16H 61/425 |
| 2020/0285846 | A1 * | 9/2020 | Yamanaka | G06Q 10/06311 |
| 2020/0294385 | A1 * | 9/2020 | Lowe | G08B 25/005 |
| 2020/0324773 | A1 * | 10/2020 | Kim | B60K 20/02 |
| 2021/0039494 | A1 * | 2/2021 | Nageshkar | B62D 1/12 |
| 2021/0155093 | A1 * | 5/2021 | Catron | B60K 35/00 |
| 2021/0197866 | A1 * | 7/2021 | Ikenori | B60T 13/741 |
| 2021/0309064 | A1 * | 10/2021 | Negishi | B60K 35/22 |
| 2021/0387643 | A1 * | 12/2021 | Hari | B60W 30/095 |
| 2021/0389769 | A1 * | 12/2021 | Hari | G05B 13/027 |
| 2022/0026899 | A1 * | 1/2022 | Kandula | G05D 1/0033 |
| 2022/0057792 | A1 * | 2/2022 | Kim | B60T 7/16 |

FOREIGN PATENT DOCUMENTS

| | | |
|---|---|---|
| CN | 107891863 A | 4/2018 |
| CN | 107957724 A | 4/2018 |
| CN | 108291638 A | 7/2018 |
| CN | 108944793 A | 12/2018 |
| CN | 108944896 A | 12/2018 |
| CN | 109154823 A | 1/2019 |
| CN | 109204306 A | 1/2019 |
| CN | 110226142 A | 9/2019 |
| CN | 111688661 A | 9/2020 |
| CN | 112208511 A | 1/2021 |
| CN | 112644451 A | 4/2021 |
| CN | 112706763 A | 4/2021 |
| CN | 112799392 A | 5/2021 |

* cited by examiner

AUTOMATIC VEHICLE CONTROL

RELATED APPLICATIONS

The present disclosure claims priority to U.S. Provisional Patent Application No. 63/223,863, filed Jul. 20, 2021, titled AUTOMATIC VEHICLE CONTROL, the entire disclosure of which is expressly incorporated by reference herein.

BACKGROUND OF THE DISCLOSURE

A utility vehicle may be used by an operator to perform any of a variety of tasks, some of which may cause the operator to be outside of the vehicle. For example, a utility vehicle may be used for carrying equipment or collecting items. However, controls to operate a utility vehicle are typically located inside the vehicle, such that an operator would likely need to leave and reenter the vehicle repeatedly during such tasks. Further, even in instances where manual controls are more easily accessible, utilizing such controls may introduce added complexity or difficulty to the task at hand.

SUMMARY OF THE DISCLOSURE

In an example, a removable input device for a vehicle is provided. The removable input device comprises: a housing adapted to be coupled to the vehicle; a beacon; a prime mover activation control; a functionality input control; and a device controller configured to receive user input from the prime mover activation control and the functionality input control, wherein a user input associated with the prime mover activation control is configured to start the vehicle and a user input associated with the functionality input control is configured to control functionality of the vehicle.

In another example, a utility vehicle is provided. The utility vehicle comprises: a frame; a power source supported by the frame; a bed supported by the frame; an operator area with a first set of controls that is accessible while an operator is seated in the operator area; and a second set of controls separate from the first set of controls that is accessible while the operator is external from the operator area.

In a further example, another utility vehicle is provided. The utility vehicle comprises: a frame; a power source supported by the frame; an object sensor supported by the frame; and a vehicle controller configured to: receive an indication to initiate object-following functionality of a target; process data from the object sensor to identify the target; and control the power source of the utility vehicle to cause the utility vehicle to follow the identified target according to the received indication.

In yet another example, a method for automatic control of a vehicle is provided. The method comprises: receiving an indication to initiate object-following functionality of a target; processing data from an object sensor of the vehicle to identify the target; and controlling a power source of the vehicle to cause the vehicle to follow the identified target according to the received indication, thereby providing object-following functionality.

In a further still example, a method for managing a vehicle under automatic control is provided. The method comprises: receiving a user input to initiate automatic vehicle control; providing, to a vehicle controller of the vehicle, an indication to initiate automatic vehicle control; receiving, from the vehicle controller, an indication of a detected obstacle; updating a display to indicate the vehicle has encountered the detected obstacle; receiving user input comprising a manual movement for the vehicle; and providing, to the vehicle controller, an indication of the manual movement for the vehicle.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

Corresponding reference characters indicate corresponding parts throughout the several views. Unless stated otherwise the drawings are proportional.

DETAILED DESCRIPTION OF THE DRAWINGS

Figure 1:
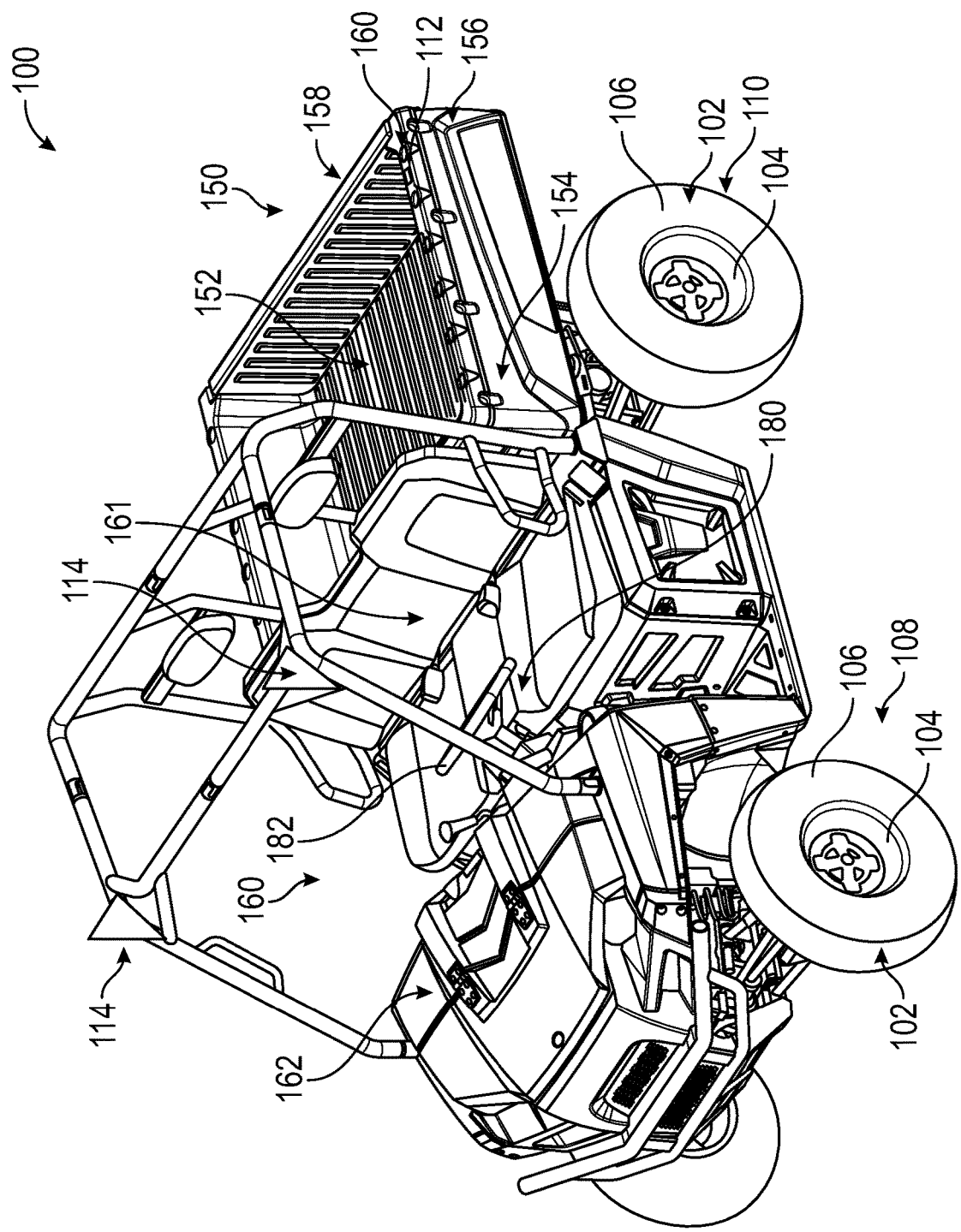
FIG. 1 is a perspective view of an example utility vehicle.

Various embodiments of the present disclosure will be described in detail with reference to the drawings, wherein like reference numerals represent like parts and assemblies throughout the several views. Reference to various embodiments does not limit the scope of the disclosure, which is limited only by the scope of the claims attached hereto. Additionally, any examples set forth in this specification are not intended to be limiting and merely set forth some of the many possible embodiments for the claimed invention.

With reference to FIGS. 1-6, an illustrative embodiment of a vehicle 100 is shown. Vehicle 100 as illustrated includes a plurality of ground engaging members 102. Illustratively, ground engaging members 102 are wheels 104 and associated tires 106. Other example ground engaging members include skis and tracks. In one embodiment, one or more of the wheels may be replaced with tracks, such as the Prospector Pro Tracks available from Polaris Industries, Inc. located at 2100 Highway 55 in Medina, MN 55340.

As mentioned herein, one or more of ground engaging members 102 are operatively coupled to a power source 130 to power the movement of vehicle 100. Example power sources include combustion engines and electric engines.

Referring to the illustrated embodiment in FIG. 1, a first set of wheels, one on each side of vehicle 100, generally correspond to a front axle 108. A second set of wheels, one on each side of vehicle 100, generally correspond to a rear axle 110. Although each of front axle 108 and rear axle 110 are shown having a single ground engaging members 102 on each side, multiple ground engaging members 102 may be included on each side of the respective front axle 108 and rear axle 110.

As configured in FIG. 1, vehicle 100 is a four wheel, two axle vehicle. In one embodiment, one or more modular subsections (not pictured) may be added to vehicle 100 to transform vehicle 100 into a three axle vehicle, a four axle vehicle, and so on. For example, a modular subsections may include a frame that is coupled to a frame 116 (see FIGS. 2A-B) of vehicle 100, which may be supported by ground engaging members associated therewith. Such a frame may be coupled to frame 116 through a plurality of connections points, such that the frame does not rotate relative to frame 116.

Vehicle 100 includes an operator area 160 generally supported by operator area portion 126 of frame 116. Operator area 160 includes seating 161 for one or more passengers. Operator area 160 further includes a plurality of operator controls 180 by which an operator may provide input into the control of vehicle 100. Controls 180 include a steering wheel 182, which is rotated by the operator to change the orientation of one or more of ground engaging members 102, such as the wheels associated with front axle 108, to steer vehicle 100. In one embodiment, steering wheel 182 changes the orientation of the wheels of front axle 108 and rear axle 110 to provide four wheel steering. In examples, controls 180 also include a first foot pedal actuatable by the vehicle operator to control the acceleration and speed of vehicle 100 through the control of power source 130 and a second foot pedal actuatable by the operator to decelerate vehicle 100 through a braking system.

Figure 2A:
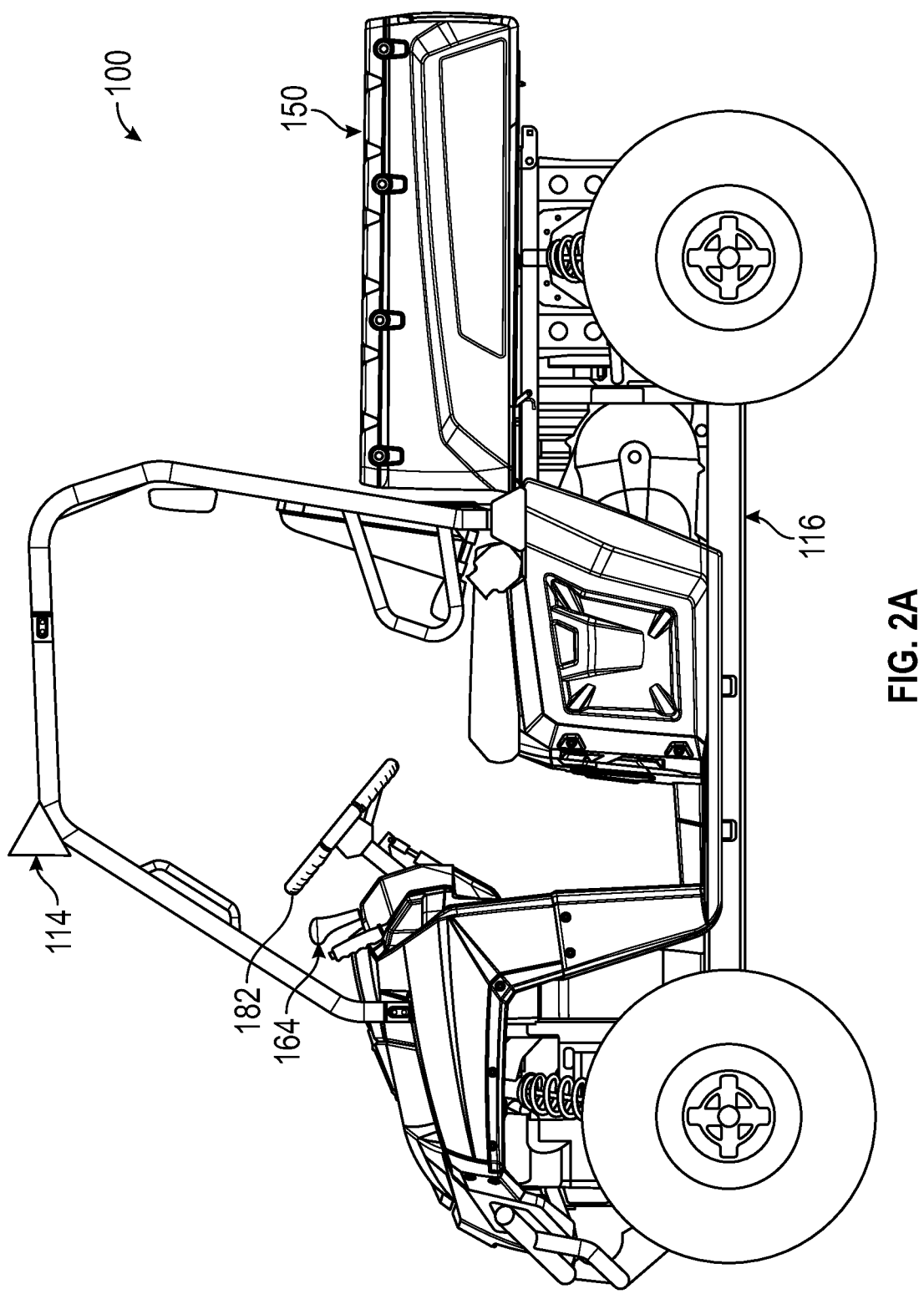
FIG. 2A illustrates a left side view of the example utility vehicle of FIG. 1.
Figure 2B:
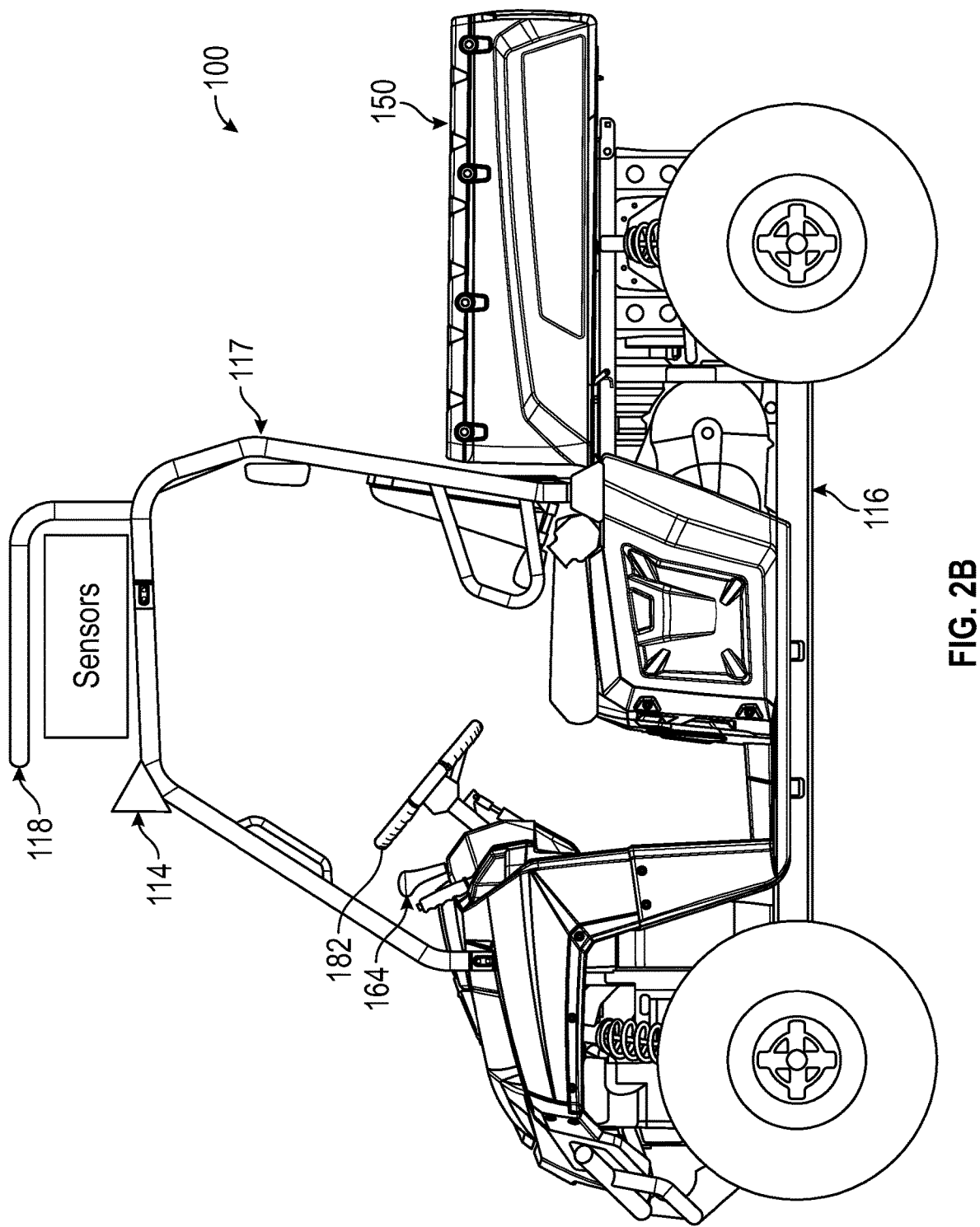
FIG. 2B illustrates another left side view of the example utility vehicle of FIG. 1.
Figure 3:
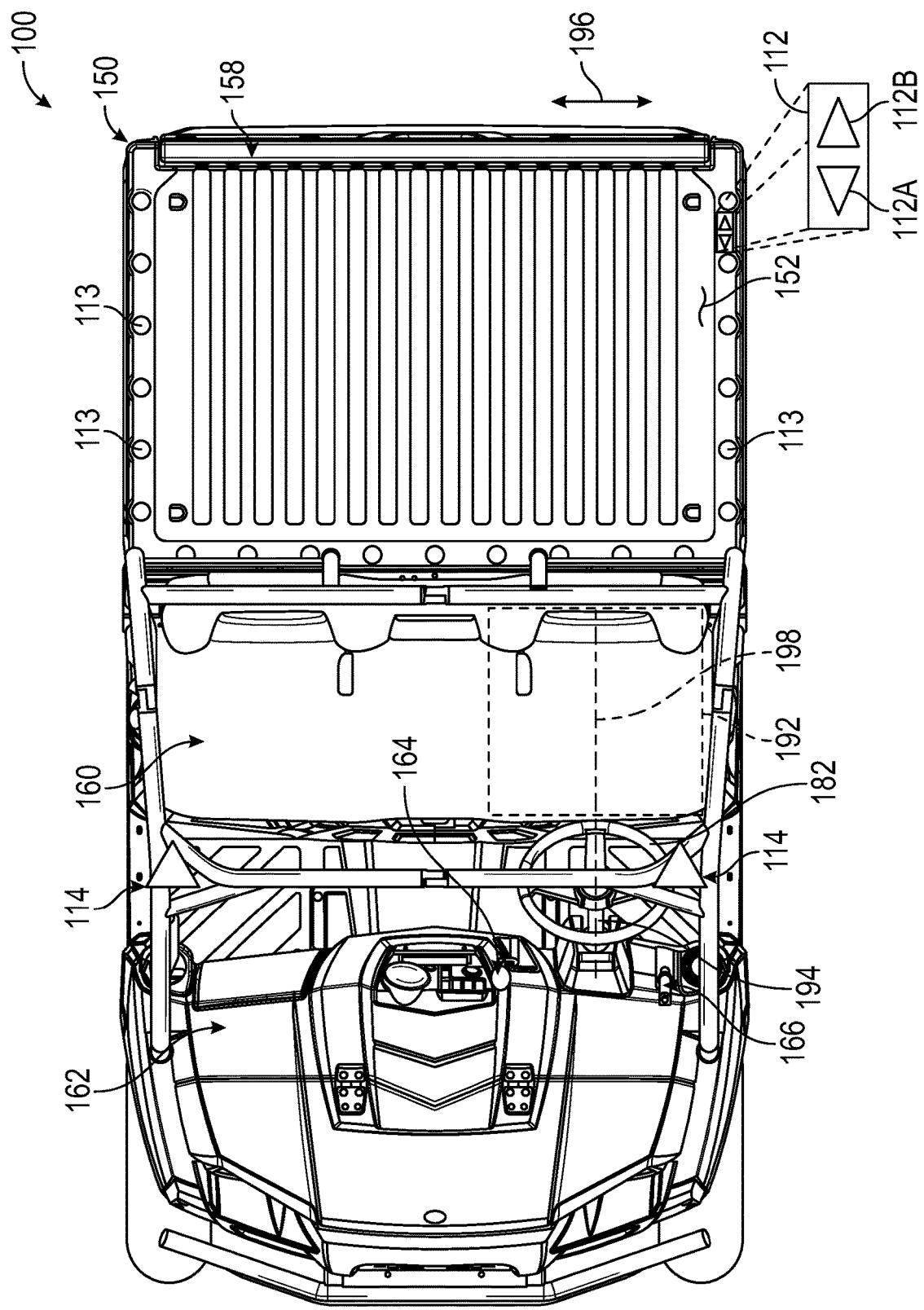
FIG. 3 illustrates a top view of the utility example vehicle of FIG. 1.
Figure 4:
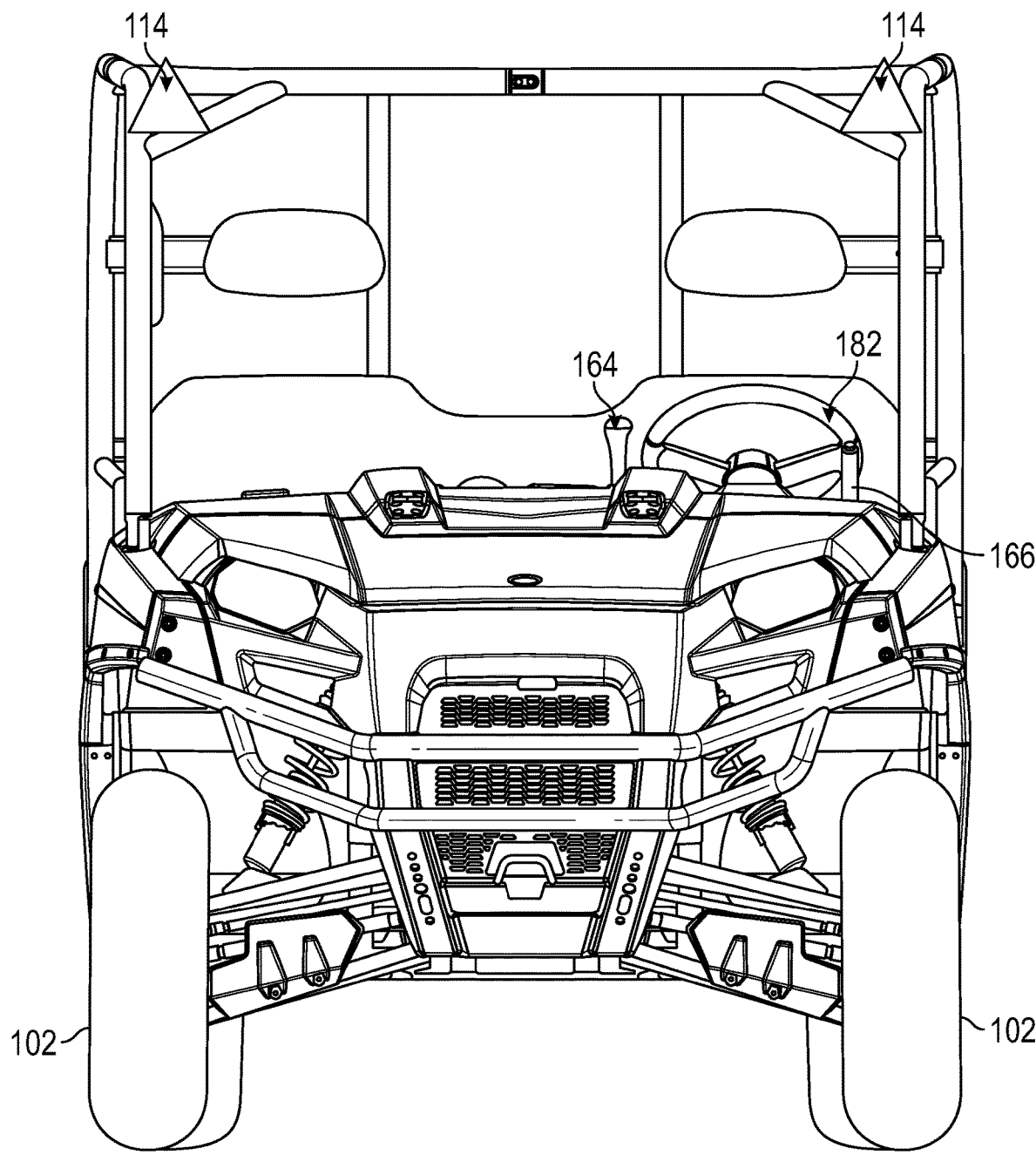
FIG. 4 illustrates a front view of the utility example vehicle of FIG. 1.
Figure 5:
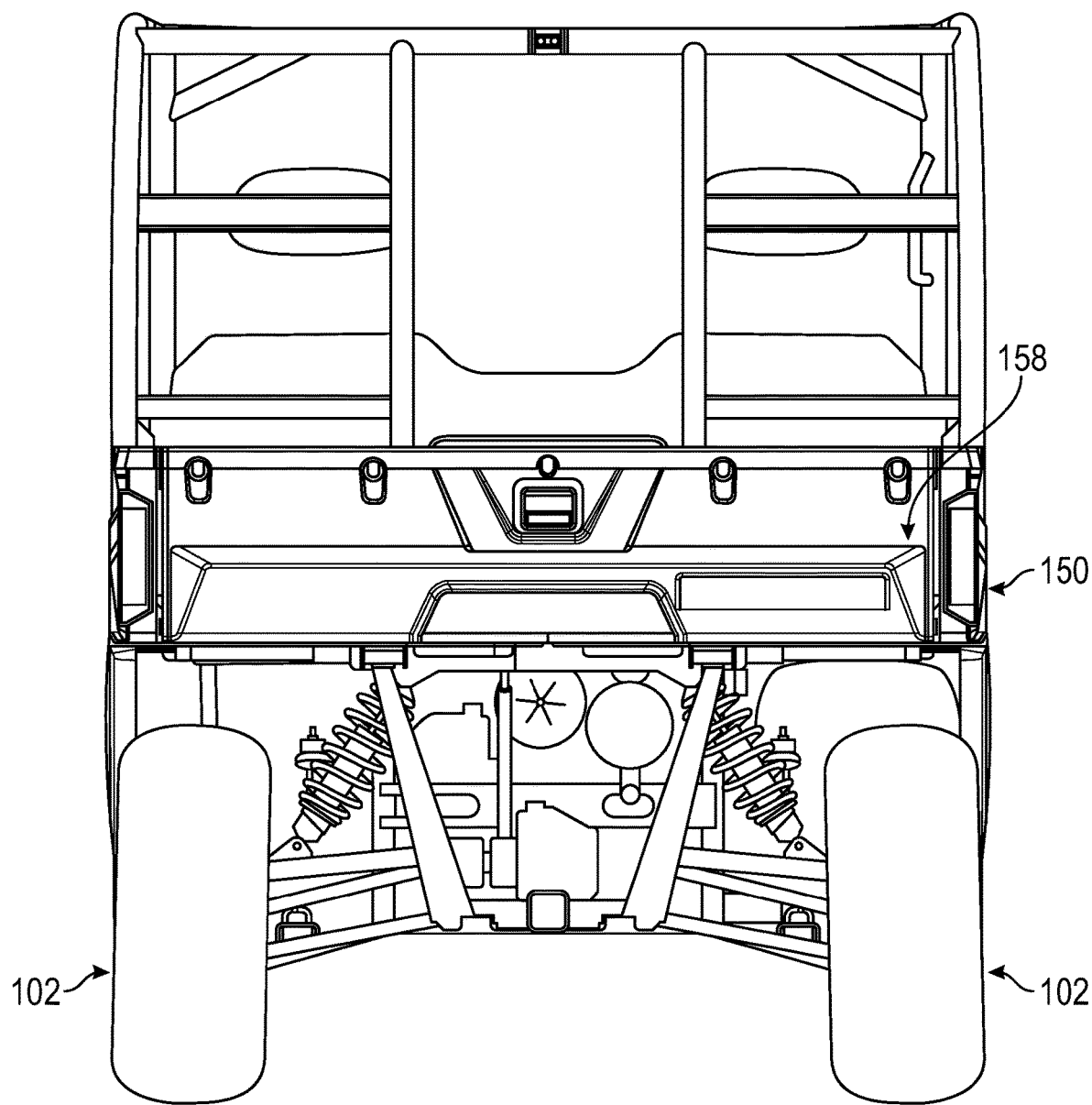
FIG. 5 illustrates a back view of the utility example vehicle of FIG. 1.

As shown in FIGS. 2-4, controls 180 further include gear shift input control 164, which is operatively coupled to the shiftable transmission of transmission 132 (FIG. 6) to communicate whether the shiftable transmission is in a low forward gear, a high forward gear, a reverse gear, neutral, and if included a park position. Although, gear shift input control 164 is shown as a lever, other types of inputs may be used. Gear shift input control 164 is positioned on a right hand side of steering column 194.

Controls 180 further include a parking brake input control 166, as shown in FIGS. 3-4. Parking brake input control 166 is operatively coupled to a parking brake of vehicle 100. In one embodiment, the parking brake is positioned on one of drive line 138 and drive line 140. In one embodiment, a master cylinder that is operatively coupled to parking brake input control 166 is positioned underneath a dashboard body member 162. Although, parking brake input control 166 is shown as a lever, other types of inputs may be used. Parking brake input control 166 is positioned on a left hand side of steering column 194.

Referring to FIG. 3, a vehicle operator position 192 on seating 161 is represented. As shown in FIG. 3, a steering column 194 of steering wheel 182 is centered side-to-side (arrows 196) as indicated by line 198 in the vehicle operator position 192.

While example functionality is described with respect to gear shift input control 164 and parking brake input control 166, it will be appreciated that, in other examples, such functionality may be provided by a single input control and/or may be removable from vehicle 100 to provide external control. Additional examples of such aspects are discussed below with respect to removable input devices 200 and 250 in FIGS. 7 and 8, respectively.

Vehicle 100 is further illustrated as comprising object sensors 114. Example sensors include, but are not limited to, cameras (e.g., visible light cameras or infrared cameras), LIDAR, radar or ultrasonic sensors, global positioning system (GPS) sensors, magnetometers (e.g., to measure a relative and/or global magnetic field), and/or radio devices. For example, object sensors 114 may each comprise an ultra-wideband (UWB) radio, such that the position of another device (e.g., an operator device or a removable input device) may be determined. As another example, object sensors 114 may include one or more infrared and/or visible light cameras, such that computer vision techniques may be used to perform object recognition to identify one or more objects surrounding vehicle 100 or, as a further example, a heat signature may be used to identify an operator of vehicle 100.

For example, an object may be learned and/or recognized by object sensors 114 using computer vision and/or machine learning techniques (e.g., to identify an object and/or to classify an identified object), such that the object may be tracked, followed, avoided, and/or used for other processing according to aspects described herein. A distance and/or direction of the object may be determined in relation to vehicle 100, for example based on the size and location of a group of one or more pixels associated with the object in image data that is obtained from object sensors 114. In instances where object sensors 114 includes multiple cameras, object detection, depth/distance detection, and/or location detection may be improved using image data that is obtained from different perspectives. For example, a set of anchor points may be identified for each respective perspective, which may be used to generate a three-dimensional (3D) representation of an object and/or at least a part of the environment surrounding vehicle 100. It will be appreciated that any of a variety of additional or alternative techniques may be used in other examples, including, but not limited to, photogrammetry and simultaneous localization and mapping (SLAM).

In some instances, object sensors 114 may comprise an emitter and a detector. For example, one object sensor 114 may be an infrared light source, while another object sensor 114 may be an infrared detector, such as a camera capable of detecting infrared light. Accordingly, a target object having a high degree of infrared reflectivity or having a specific pattern may be detected by object sensors 114, thereby enabling vehicle 100 to identify and follow the target object. For example, the target object may be attached to an operator or to another vehicle. As another example, the target object may be part of or otherwise integrated into a clothing garment, such as a vest. The target object may have one or more known dimensions, such that a distance between vehicle 100 and the target object may be determined based on the size of the object as captured by object sensors 114, while the bearing may be determined based on the displacement of the object as compared to a center position of object sensors 114. As another example, the bearing may be determined using a plurality of cameras, such that a displacement of the object may be determined for each camera and processed accordingly to generate a bearing of the target in relation to vehicle 100.

While two object sensors 114 are illustrated, it will be appreciated that any number of sensors may be used. Further, each of object sensors 114 need not be the same type of sensor. For example, a camera may be used in combination with a GPS sensor to provide higher resolution positioning than may be obtained with either sensor type individually. It will also be appreciated that object sensors 114 may be positioned at any of a variety of other locations and need not be limited to positioning on or within vehicle 100. For instance, one or more object sensors may be stationary external to vehicle 100 or supported by an unmanned aerial vehicle such as a drone, among other examples.

As illustrated in FIG. 2B, sensors 114 may be positioned on a roof of vehicle 100 or a top portion of a roll cage 117. As illustrated, roll cage 117 is attached to the frame forward of operator area 160 and is further attached to vehicle 100 toward the rear of operator area 160, such that it extends along at least a portion of vehicle 100. In examples, an additional structure 118 may be attached to roll cage 117, thereby providing protection to sensors 114 that are positioned on top of vehicle 100.

Accordingly, object sensors 114 may be used to provide object-following functionality and obstacle-avoidance functionality according to aspects described herein, among other examples of such automatic vehicle control. For instance, object sensors 114 may be used to identify and/or track an object that vehicle 100 should follow (e.g., within a predetermined distance and/or according to a predefined offset distance or angle). As an example, the location of an operator device, a removable input device, or a target object may be determined using object sensors 114 (e.g., as may be determined using one or more visible light cameras, infrared cameras, and/or UWB radios, among other sensors), such that the position of vehicle 100 may be updated relative to the target to maintain the predetermined distance and/or predetermined bearing as necessary. As another example, object sensors 114 may identify and track one or more other vehicles, such that a "train" of vehicles may be automatically formed and/or the location of vehicle 110 may be maintained relative to that of one or more other vehicles. Thus, data output from object sensors 114 may be processed to identify objects and/or distinguish between a human operator, a target object, and/or extraneous objects such as grass, trees, or fencing, among other examples.

In other instances, object sensors 114 may identify an obstacle in the path of vehicle 100 (e.g., while vehicle 100 is operating according to the described automatic vehicle control techniques). Accordingly, manual control of vehicle 100 may be at least temporarily provided to an operator (e.g., via an operator device or a removable input device), thereby enabling the operator to maneuver vehicle 100 so as to avoid the identified obstacle.

Vehicle 100 is further illustrated as comprising a bed 150 having a cargo carrying surface 152. Cargo carrying surface 152 may be flat, contoured, and/or comprised of several sections. In one embodiment, bed 150 is rigidly coupled to frame 116. In one embodiment, bed 150 is rotatably coupled to frame 116 and may be tilted so that a front portion 154 is higher relative to back portion 156. Back portion 156 includes a tailgate 158, which may be lowered to improve ingress to and egress from bed 150. Bed 150 further includes a plurality of mounts for receiving an expansion retainer (not shown) which may couple various accessories to bed 150. Additional details of such mounts and expansion retainers are provided in U.S. Pat. No. 7,055,454, to Whiting et al., filed Jul. 13, 2004, titled "Vehicle Expansion Retainers," the disclosure of which is expressly incorporated by reference herein. When a modular subsection is coupled to vehicle 100, bed 150 may be replaced with a longer bed or platform, which extends over such a modular subsection.

Bed 150 is further depicted as having external controls 112, which are shown in more detail in FIG. 3. As compared to controls 180, which are included in operator area 160, external controls 112 are positioned so as to be accessible when an operator is external to vehicle 100 (e.g., outside of operator area 160). As illustrated, external controls 112 comprise forward input control 112A and reverse input control 112B. Accordingly, an operator of vehicle 100 may actuate forward input control 112A to cause vehicle 100 to move forward or reverse input control 112B to cause vehicle 100 to move backward, even when the operator is not in operator area 160.

While external controls 112 are illustrated as comprising a forward input control and a reverse input control, it will be appreciated that any of a variety of other input controls may be used. For example, external controls 112 may additionally or alternatively include a joystick input control that is operable to cause vehicle 100 to move in any of a variety of directions (e.g., thereby providing functionality similar to that of steering wheel 182). As another example, external controls 112 may be positioned in any of a variety of other locations or may be removable. For instance, external controls 112 may removably attach to bed 150 and may wirelessly control vehicle 100, such that external controls 112 may be repositioned to a location that is convenient for the operator (e.g., a right or left side of vehicle 100 depending on the task for which vehicle 100 is used). As another example, external controls 112 may have a housing adapted to removably couple with bed 150, for example in one of holes 113.

As a further example, external controls 112 may comprise a handle, lever, or other mechanism on the exterior of vehicle 110, which may be pushed and pulled to control the movement of vehicle 110. In another example, external controls 112 may comprise a tether having an adjustable length, where the amount of the tether that has been extended is proportional to a speed of the vehicle, while the angle of the tether may affect a direction of travel for vehicle 100. In some instances, the tether may be removably attached to an operator or to another vehicle (e.g., magnetically or using a breakaway clasp), thereby causing vehicle 100 to follow the operator, another vehicle, or any of a variety of other objects accordingly.

Figure 6:
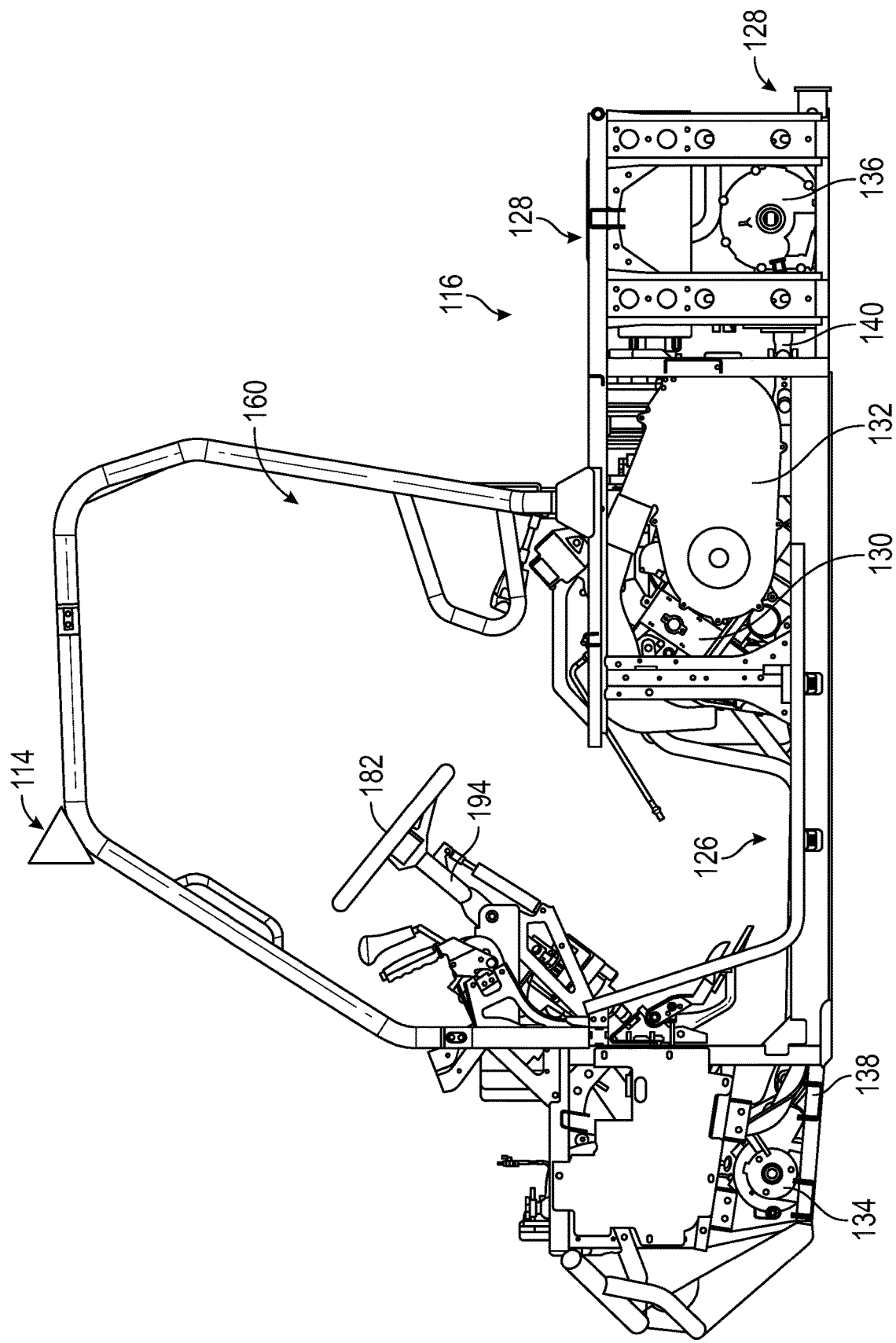
FIG. 6 illustrates a side view of a portion of the utility vehicle of FIG. 1 illustrating the placement of a front differential, a power source, a transmission, and a rear differential.

Turning to FIG. 6, a power source 130, illustratively a combustion engine, is supported by frame 116. Power source 130 is shown as a combustion engine. In one embodiment, power source 130 is a multifuel engine capable of utilizing various fuels. An example multifuel engine capable of utilizing various fuels is disclosed in U.S. patent application Ser. No. 11/445,731, filed Jun. 2, 2006, the disclosure of which is expressly incorporated by reference herein. In one embodiment, power source 130 is a hybrid electric engine. In one embodiment, power source 130 is an electric motor.

Power source 130 is coupled to a front differential 134 and a rear differential 136 through a transmission 132 and respective drive line 138 and drive line 140. Drive line 138 and drive line 140, like other drive lines mentioned herein, may include multiple components and are not limited to straight shafts. For example, front differential 134 may include two output shafts (not pictured), each coupling a respective ground engaging members 102 of front axle 108 to front differential 134. In a similar fashion, rear differential 136 includes two output shafts, each coupling a respective ground engaging members 102 of rear axle 110 to rear differential 136.

In one embodiment, transmission 132 may include a shiftable transmission and a continuously variable transmission ("CVT"). The CVT is coupled to power source 130 and the shiftable transmission. The shiftable transmission is coupled to drive line 138, which is coupled to front differential 134 and to drive line 140 which is coupled to rear differential 136. In one embodiment, the shiftable transmission is shiftable between a high gear for normal forward driving, a low gear for towing, and a reverse gear for driving in reverse. In one embodiment, the shiftable transmission further includes a park setting, which locks the output drive of the shiftable transmission from rotating. Example shiftable transmissions and CVTs are disclosed in U.S. Pat. Nos. 6,725,962 and 6,978,857, the disclosures of which are expressly incorporated by reference herein. In other examples, one or more axles (e.g., axle 108 or 110) may be non-powered axles.

Various configurations of front differential 134 and rear differential 136 are contemplated. Regarding front differential 134, in one embodiment front differential 134 has a first configuration wherein power is provided to both of the ground engaging members 102 of front axle 108 and a second configuration wherein power is provided to one of ground engaging members 102 of front axle 108.

Regarding rear differential 136, in one embodiment rear differential 136 is a locked differential wherein power is provided to both of the ground engaging members 102 of rear axle 110 through the output shafts. When rear differential 136 is in a locked configuration power is provided to both wheels of rear axle 110. When rear differential 136 is in an unlocked configuration, power is provided to one of the wheels of rear axle 110.

Additional discussion of vehicle 100 and related aspects are disclosed in U.S. Pat. No. 7,950,486, the disclosure of which is expressly incorporated by reference herein.

Figure 7:
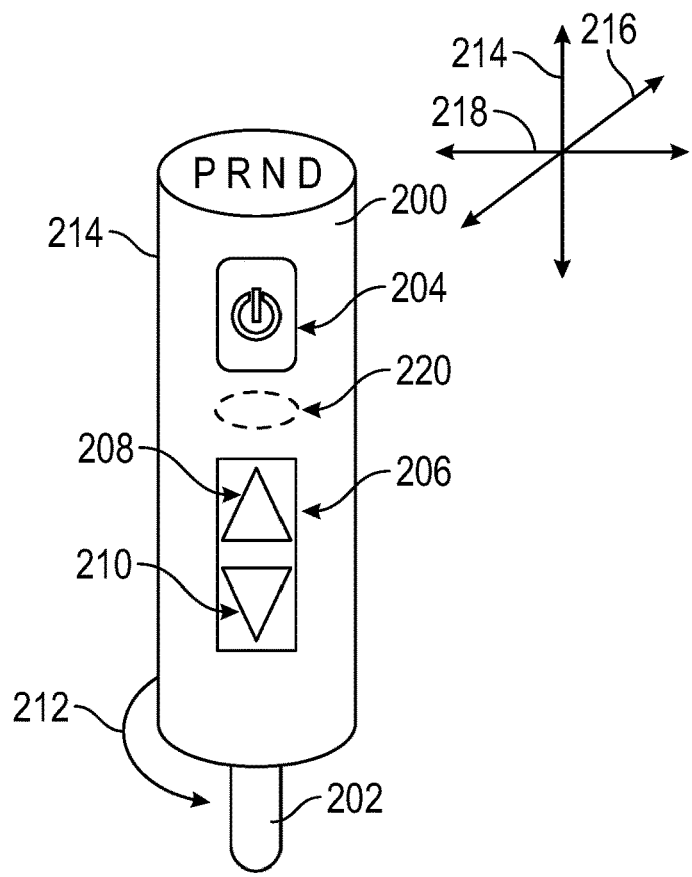
FIG. 7 illustrates a front view of an example removable input device for the example utility vehicle of FIG. 1.

FIG. 7 illustrates a front view of an example removable input device 200. In examples, aspects of removable input device 200 may be similar to those of gear shift input control 164 and/or brake input control 166 discussed above with respect to FIGS. 1-6. For instance, removable input device 200 may be provided in place of and offer similar functionality to gear shift input control 164 and/or brake input control 166.

As illustrated, removable input device 200 is removably coupled to shaft 202. For example, shaft 202 may comprise a set of magnets configured to attract a similar yet opposing set of magnets of removable input device 200. As another example, shaft 202 may comprise one or more pins configured to slot into one or more grooves of removable input device 200. The grooves of removable input device 200 may be configured to enable shaft 202 to be disposed within removable input device 200, after which removable device 200 may rotate about shaft 202, thereby securing removable input device 200 in place with respect to shaft 202. It will be appreciated that any of a variety of mechanisms may be used to removably couple removable input device 200 to shaft 202. The housing 214 of removable input device 200 may be formed such that it can be removably coupled to a vehicle (e.g., outside of an operator area when it is decoupled from shaft 202). For example, removable input device 200 may be removably coupled to bed 150 of vehicle 100 using one of holes 113 and used in a remote mode of operation.

Shaft 202 may further comprise a charging means and/or a communication means for removable input device 200. As an example, shaft 202 may comprise a set of contacts that electrically couple with removable input device 200 when removable input device 200 is mechanically coupled or "docked" with shaft 202. The set of contacts may provide power to charge a rechargeable battery of removable input device 200. Removable input device 200 may comprise a charge indicator to indicate a state of charge associated with the battery (e.g., a charge level and whether the battery is charging). As another example, the set of contacts may electrically couple a controller of removable input device 200 to a controller of vehicle 100. Thus, when removable input device 200 is coupled to shaft 202, removable input device 200 may communicate with vehicle 100 using wired communication, while removable input device 200 may use wireless communication in instances where removable input device 200 is detached from shaft 202.

In some instances, removable input device 200 may be charged wirelessly by shaft 202 and/or may use wireless communication to communicate with vehicle 100 regardless of whether removable input device 200 is coupled with shaft 202. For instance, removable input device 200 and shaft 202 may each implement wireless charging technology similar to that of the QI wireless power transfer standard. It will be appreciated that any of a variety of communication and/or charging techniques may be used.

As illustrated, input device 200 may be moveable about axes 214, 216, and/or 218. For example, an operator may move removable input device 200 about one or more axes 214, 216, and/or 218 to shift transmission 132 of vehicle 100 to a low forward gear, a high forward gear, a reverse gear, neutral, and if included a park position, among other examples.

Arrow 212 is provided to indicate that, in other examples, removable input device 200 may be rotatable (e.g., about axis 214). For example, an operator may rotate removable input device 200 to choose between park, reverse, neutral, and drive modes of operation. As another example, rotation of removable input device 200 may increase or decrease the brightness of one or more lights of vehicle 100, control an audio volume, or enable an operator to select between a low forward gear and a high forward gear, among other examples. The behavior of removable input device 200 may be user-configurable, such that the operator may select behaviors associated with rotation and/or movement about axes 214, 216, and/or 218.

As illustrated, removable input device 200 further comprises prime mover activation control 204 and functionality input control 206. Prime mover activation control 204 may control one or more electrical systems and/or power source 130 of vehicle 100. For example, actuating prime mover activation control 204 may cause power to be provided to various controllers of vehicle 100 (e.g., controllers 170-178 in FIG. 9). Holding prime mover activation control 204 may cause power source 130 to be activated. For example, a combustion engine of power source 130 may be started via a starter motor or power may be provided to one or more electric motors of power source 130, among other examples. In instances where power is being supplied to such controllers and/or power source 130 is activated, actuating prime mover activation control 204 may disrupt the power supplied to such controllers and/or power source 130 may be deactivated.

Functionality input control 206 is illustrated as comprising forward input control 208 and reverse input control 210. In examples, functionality input control 206 is used to control any of a variety of functionality of vehicle 100. For example, if vehicle 100 comprises a winch, forward input control 208 may be used to pull in a rope or cable and, conversely, reverse input control 210 may be used to let out the rope or cable. As another example, functionality input control 206 may be similar to external controls 112, such that forward input control 208 may be actuated to cause vehicle 100 to move forward and reverse input control 112B may be actuated to cause vehicle 100 to move backward.

It will be appreciated that any of a variety of additional or alternative functionality may be controlled by functionality input control 206 and, further, functionality input control 206 need not be limited to forward input control 208 and reverse input control 210. For example, functionality input control 206 may additionally or alternatively include a joystick input control or touch screen input control operable receive operator input indicating any of a variety of directions (and, in some examples, of differing magnitude). Additionally, while removable input device 200 is illustrated as comprising a single functionality input control 206, any number of such similar elements may be included in other examples.

As noted above, the behavior of removable input device 200 (as well as prime mover activation control 204 and functionality input control 206) may be user-configurable. As another example, the behavior may change based on context, such that removable input device 200 has different modes of operation (e.g., a docked or coupled mode of operation, and a remote mode of operation). As an example, when removable input device 200 is coupled to stem 202 (e.g., within operator area 160), prime mover activation control 204 may behave as described above and functionality input control 206 may control a winch. However, when removable input device 200 is no longer coupled to stem 202 (e.g., thereby placing it in the remote mode), prime mover activation control 204 may instead control one or more lights of vehicle 100, while functionality input control 206 may instead be usable to move vehicle 100. As another example, prime mover activation control 204 may be usable to remotely start vehicle 100, after which it may provide such alternative functionality once vehicle 100 is in operation.

Additionally, similar to the shift control behavior discussed above when removable input device 200 is coupled to shaft 202, movement about axes 214, 216, and 218 may be detected by an inertial measurement unit (IMU) of removable input device 200. As a result, moving removable input device 200 about axes 214, 216, and/or 218 while in the remote mode of operation may provide similar functionality even when uncoupled from shaft 202. As a further example, an IMU of removable input device 200 may be used to detect user input specifying a direction and/or speed of travel. In such instances, received user input may be used to control the vehicle while an input control is held (e.g., prime mover activation control 204) or, as another example, such an input mode may be toggled according to user input.

Removable input device 200 is further illustrated as comprising beacon 220, which is illustrated using a dashed line to indicate that it may be embedded within removable input device 200. For example, removable input device 200 may comprise a radio-frequency identification (RFID) tag or a radio transmitter, such as a UWB radio. Accordingly, the location of removable input device 200 with respect to vehicle 100 may be determined by object sensors 114 in combination with beacon 220. As an example, an RFID tag may generate a modulated signal in response to an incoming signal, which may be received by object sensors 114. The modulated signal may then be processed by vehicle 100 to generate a distance and/or a bearing based on a differential signal strength. As another example, machine learning and/or computer vision techniques may be used to process image data from one or more visible and/or infrared light cameras to determine the location of removable input device 200 with respect to vehicle 100 accordingly.

As a result, removable input device 200 may be used to provide the object-following functionality described herein, thereby enabling vehicle 100 to follow removable input device 200 according to aspects of the present disclosure. In such instances, an input control of removable input device 200 (e.g., prime mover activation control 204 or functionality input control 206) may enable an operator to toggle between manual operation (e.g., via controls 112, 180, and/or those provided by removable input device 200) and automatic operation. In instances where vehicle 100 detects an object in its path, removable input device 200 may be used to manually control vehicle 100 around the detected object, after which automatic operation may resume. In such instances, an indication may be provided to the operator (e.g., a visual indicator, an audible indication, and/or a physical indication such as a vibration), thereby alerting the operator that manual control may be used to maneuver vehicle 100 around a detected object and resume automatic operation accordingly.

Beacon 220 of removable input device 200 may further be used to locate removable input device 200. For example, an operator device (e.g., similarly comprising a UWB radio) may detect beacon 220 or, as another example, an audible or visual indication may be provided (e.g., by the operator device or vehicle 100) that changes with proximity to removable input device 200.

Figure 8:
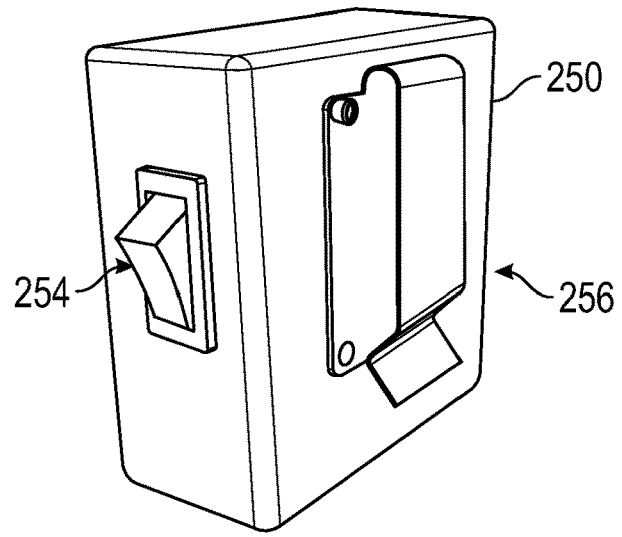
FIG. 8 illustrates a perspective view of another example removable input device for the example utility vehicle of FIG. 1.

FIG. 8 illustrates a perspective view of another example removable input device 250 for the example utility vehicle 100 of FIG. 1. Aspects of removable input device 250 are similar to removable input device 200 discussed above with respect to FIG. 7 and are therefore not necessarily re-described below in detail.

As illustrated, removable input device 250 comprises switch 254 and clip 256. Similar to prime mover activation control 204, switch 254 may control various aspects of vehicle 100. For example, switch 254 may toggle between manual operation and automatic operation of vehicle 100. In automatic operation, vehicle 100 may determine the location of removable input device 250 using a beacon (not pictured) of removable input device 200 in conjunction with object sensors 114, as discussed above. As another example, the case of removable device 250 may comprise a pattern that is recognizable by object sensors 114 using computer vision techniques. An operator may attach removable input device 250 to his or her person, or any of a variety of objects, using clip 256. For example, removable input device 250 may be clipped to a belt or other clothing garment of the operator.

Accordingly, it will be appreciated that any of a variety of removable input devices may be used according to aspects of the present disclosure. For example, while removable input device 200 is described as being similar to input controls 164 and 166, a removable input device may be similar to steering wheel 182. For example, such a steering wheel may similarly be removable from vehicle 100, may include a beacon or a visual target, and may offer similar operation modes as described above with respect to removable input devices 200 and 250. A removable input device may enable an operator to operate vehicle 100 when outside of the vehicle and, in some examples, may further restrict operation of vehicle 100 to other individuals (e.g., those who are not currently in possession of the removable input device) by virtue of physically removing a control from operator area 160.

Figure 9:
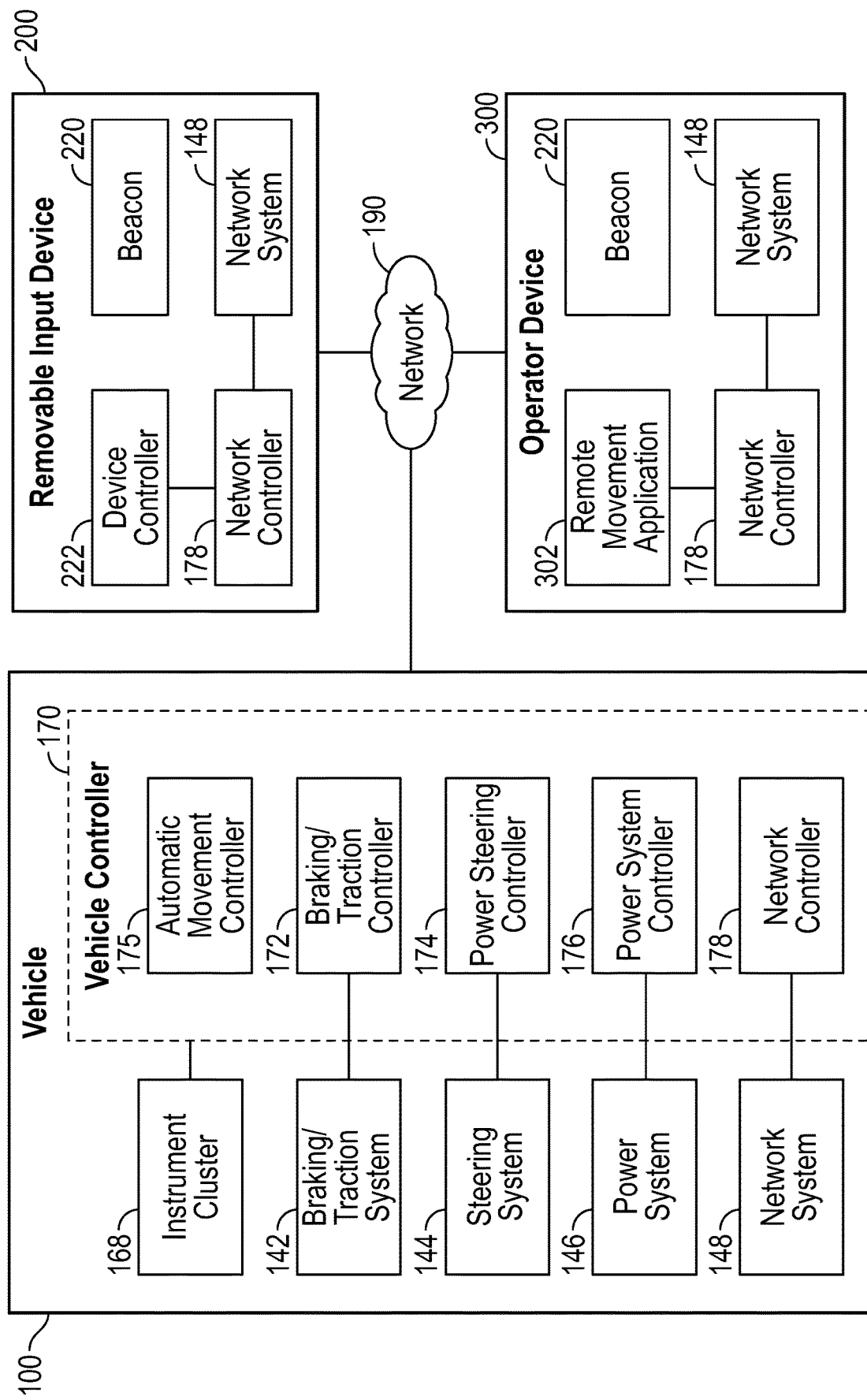
FIG. 9 is a representative view of example components of the vehicle of FIG. 1, the removable input devices of FIGS. 7-8, and an operator device.

FIG. 9 is a representative view of example components of the vehicle 100 of FIG. 1, the removable input devices 200 and 250 of FIGS. 7-8, and an operator device 300. Vehicle 100 is illustrated as comprising instrument cluster 168, which provides an operator interface and includes at least one input device and at least one output device. Example input devices include levers, buttons, switches, soft keys, and other suitable input devices. Example output devices include lights, displays, audio devices, tactile devices, and other suitable output devices. Vehicle controller 170 may provide information for display via instrument cluster 168 and/or receive user input from instrument cluster 168 that may affect operation of vehicle 100 and/or information presented via instrument cluster 168, among other examples.

As illustrated, vehicle controller 170 is represented as including several controllers. These controllers may each be single devices or distributed devices or one or more of these controllers may together be part of a single device or distributed device. The functions of these controllers may be performed by hardware and/or as computer instructions on a non-transient computer readable storage medium.

In one embodiment, vehicle controller 170 includes at least two separate controllers, which communicate over a network. In one embodiment, the network is a CAN network. In one embodiment, the CAN network is implemented in accord with the J1939 protocol. Details regarding an exemplary CAN network are disclosed in U.S. patent application Ser. No. 11/218,163, filed Sep. 1, 2005, the disclosure of which is expressly incorporated by reference herein. Of course any suitable type of network or data bus may be used in place of the CAN network. In one embodiment, two wire serial communication is used.

Controller 170 includes a braking/traction controller 172, which controls the operation of braking/traction system 142. In one example, braking/traction controller 172 controls braking/traction system 142 of vehicle 100, such as the pressure and frequency of the actuation of one or more brake calipers of vehicle 100. For example, braking/traction controller 172 may receive user input via external controls 112 and control braking/tracking system 142 accordingly. Further, braking/traction controller 172 monitors a plurality of sensors. Example sensors include a vehicle speed sensor that monitors track speed and an engine RPM sensor. In one embodiment, braking/traction system 142 includes anti-lock brakes. In one embodiment, braking/traction system 142 includes active descent control and/or engine braking. In one embodiment, braking/traction system 142 includes a brake and in some embodiments a separate parking brake.

Controller 170 further includes a power steering controller 174, which controls the operation of steering system 144. In one example, power steering controller 174 controls an amount of assist provided by a power steering unit of vehicle 100. For example, power steering controller 174 may receive user input via external controls 112 and control power steering system 144 accordingly. Further, power steering controller 174 monitors a plurality of sensors. Example sensors are provided in U.S. patent application Ser. No. 12/135,107, assigned to the assignee of the present application, titled VEHICLE, the disclosure of which is expressly incorporated by reference herein.

Controller 170 further includes a power system controller 176, which controls the operation of power system 146. For example, power system 146 may comprise at least one of power source 130, transmission 132, and differentials 134 and 136. In one example, power source 130 is an internal combustion engine and power system controller 176 controls the provision of fuel, provision of spark, engine performance, reverse operation of vehicle, locking differential, all wheel drive, ignition timing, electrical power distribution, transmission control. For example, power system controller 176 may receive user input via external controls 112 and control power system 146 accordingly. Further, power system controller 176 monitors a plurality of sensors. Example sensors include a temperature sensor, which monitors the temperature of a coolant that circulates through the engine, throttle position sensor (TPS), exhaust gas temperature sensor (EGT), crank position sensor (CPS), detonation sensor (DET), airbox pressure sensor, intake air temperature sensor, and other parameters as required to control the engine performance.

Controller 170 further includes a network controller 178, which controls communications between vehicle 100 and other devices (e.g., removable input device 200 and operator device 300) via network 190. For example, network 190 may comprise a local area network, a peer-to-peer network, the Internet, or any of a variety of other networks. In one embodiment, network controller 178 of vehicle 100 communicates with paired devices via network 190. An example wireless network is a radio frequency network utilizing a BLUETOOTH protocol. In this example, network system 148 may include a radio frequency antenna. Network controller 178 controls the pairing of devices to vehicle 100 and the communications between vehicle 100 and such remote devices. An example remote device is removable input device 200 and/or operator device 300 described herein. It will be appreciated that any of a variety of network technologies may be used and that, while one example network 190 is illustrated, any number of networks and associated technologies may be used. For example, network system 148 may include a cellular antenna, a satellite antenna, and/or one or more components for wired communication.

Vehicle controller 170 further includes automatic movement controller 175. Automatic movement controller 175 may process data output from object sensors 114 to provide object-following functionality and obstacle-avoidance functionality according to aspects described herein. For example, automatic movement controller 175 may process such data output to perform object recognition using computer vision techniques or to determine a distance and/or bearing of a target as described above. Accordingly, automatic movement controller 175 may communicate with any of a variety of other controllers 172, 174, 176, and/or 178 to control systems 142-148 of vehicle 100.

In some instances, automatic movement controller 175 verifies the accuracy of a determined distance and/or bearing. For example, such determinations generated using data output from a UWB radio may be inaccurate in instances where UWB radio signals travel through a human or other objects. Accordingly, automatic movement controller 175 may evaluate distance and/or bearing determinations according to data output from additional sensors or using rules and/or machine learning techniques (e.g., a sudden or unexpectedly large change in distance and/or bearing may instead be determined to be indicative of an obstructed radio signal). As another example, automatic movement controller 175 uses data output from any of a variety of other sensors to perform such verification. For example, a camera and computer vision techniques may be used.

Automatic movement controller 175 may provide and receive any of a variety of indications from a removable input device or from an operator device. For example, automatic movement controller 175 may provide an indication of a detected obstacle. Example indications that may be received include, but are not limited to, an indication to begin automatic operation (e.g., to operate according to the disclosed object-tracking techniques or to maneuver according to a predetermined path or to a specified location), an indication to end automatic operation, and/or an indication comprising manual input, which may be communicated to controllers 172, 174, 176, and/or 178 in order to avoid a detected obstacle. Such indications may be provided to and received from network controller 178, for example that may be in communication with removable input device 200 and/or operator device 300 via network 190.

Automatic movement controller 175 may detect any of a variety of other scenarios in which automatic vehicle control should be stopped or temporarily suspended. For example, automatic movement controller 175 may determine an input torque on steering wheel 182 exceeds a predetermined threshold (e.g., as may be determined based on information from power steering controller 174). As another example, automatic movement controller 175 may determine brake input exceeds a predetermined threshold (e.g., as may be determined based on information from braking/traction controller 172). As a further example, automatic movement controller 175 may determine throttle input exceeds a predetermined threshold (e.g., as may be determined based on information from power system controller 176). While example instances are described herein, it will be appreciated that any of a variety of alternative or additional such instances may be identified by automatic movement controller 175 so as to terminate or temporarily suspend automatic vehicle control according to aspects described herein.

In some instances, automatic movement controller 175 processes voice input to control vehicle 100 accordingly. For example, voice input may be received via instrument cluster 168 (e.g., which may comprise one or more microphones). As another example, voice input may be received from removable input device 200 and/or operator device 300. Automatic movement controller 175 may apply natural language processing techniques to generate a command based on the received voice input. In some instances, automatic movement controller 175 may process the voice input or, in other instances, at least a part of the voice input may be provided to another computing device for processing (e.g., operator device 300 or another computing device accessible via network 190). In other examples, rather than receiving the voice input, another computing device may process the voice input such that automatic movement controller 175 may instead receive a command. For example, a virtual assistant "skill" may process voice input provided by an operator and a resulting command may be received by automatic movement controller 175 accordingly.

Automatic movement controller 175 may determine a type for the received command, such that automatic movement controller 175 instructs the appropriate controller 172, 174, 176, and/or 178 based on the received command. Example commands include, but are not limited to, an instruction to move a certain distance, using a certain gear, according to a predetermined path, to a specific location, at a certain speed, and/or in a certain direction (e.g., "start the ignition," "move forward five feet," "shift transmission to high," "drive to the house," "park in the shed," or "deliver tools to waypoint five"). As another example, commands may be received to control vehicle functionality (e.g., "turn on the main light bar," "turn off headlights," "dim main light bar to fifty percent," "turn on sprayer," "increase sprayer flow rate by 10 percent," "retract boom," "turn off left boom," "turn on spreader," "increase spreader speed by 10 percent," "dump the bed," or "return bed to home position"). Additionally, commands may be received to control object-following functionality (e.g., "follow behind me at six feet" or "follow behind my right hip"). Any of a variety of monitoring commands may be received as well (e.g., "alert me if movement above 10 miles per hour occurs" or "notify me if you leave geofence one"). In some instances, commands may be received that request information associated with vehicle 100, such that automatic movement controller 175 may query controller 172, 174, 176, and/or 178 for the requested information, which may be provided in response to the received command.

Voice input may be received as a result of a user pressing and/or holding an input control (e.g., a physical button or a user interface element). As another example, voice input may be received as a result of identifying a wake word or phrase (e.g., "hey vehicle, . . . "). In some instances, automatic movement controller 175 may receive an indication that an input control is pressed and/or held in order to cause vehicle 100 to perform a command. For example, the input control may enable an operator to cause vehicle 100 to operate automatically even after an obstacle has been detected or, as another example, vehicle 100 may perform the command as long as the input control is held. In such instances, when the input control is no longer held, automatic movement controller 175 may provide an indication to one or more controllers 172, 174, and/or 176 to stop vehicle 100 and/or apply a brake.

In FIG. 9, removable input device 200 is illustrated as comprising device controller 222. In examples, device controller 222 processes input received from prime mover activation control 204, functionality input control 206, and/or detected movements of removable input device 200 (e.g., movements about axes 214, 216, and/or 218, as well as rotation following arrow 212, among other examples). Device controller 222 may also control charging of a battery of removable input device 200, as well as communicating processed input to vehicle controller 170 using wireless and/or wired communication (e.g., via network 190 or a CAN bus), as discussed above. Additionally, device controller 222 may process received input differently according to an operation mode (e.g., docked or remote), such that different indications may be provided to vehicle controller 170 accordingly. In other instances, such processing may instead be performed by vehicle controller 170, such that the same or similar indications are provided by device controller 222 regardless of an operating mode. In some instances, beacon 220 and device controller 222 communicate to facilitate object detection by object sensors 114. For example, device controller 222 may receive an indication of a signal emitted by object sensors 114, such that device controller 222 may provide an indication of a response signal to be generated by beacon 220. In other examples, an indication associated with the received signal may be provided to vehicle 110 via network 190.

FIG. 9 is further illustrated as comprising operator device 300. Operator device 300 may be any of a variety of computing devices, including, but not limited to, a mobile computing device, a tablet computing device, or a laptop computing device. As illustrated, operator device 300 comprises remote movement application 302. Remote movement application 302 is usable by an operator of operator device 300 to control aspects of the automatic vehicle control techniques described herein (e.g., via network 190). For example, remote movement application 302 may enable an operator to configure object-following functionality, such as specifying a distance and/or bearing with which to follow an object. As another example, remote movement application 302 may control any of a variety of other functionality, similar to the above-discussed techniques relating to voice commands and/or removable input device 200. Additionally, remote movement application 302 may receive and/or process voice input, which may be provided to automatic movement controller 175 accordingly. Example user interface aspects of remote movement application 302 are discussed below with respect to FIG. 13.

Figure 10A:
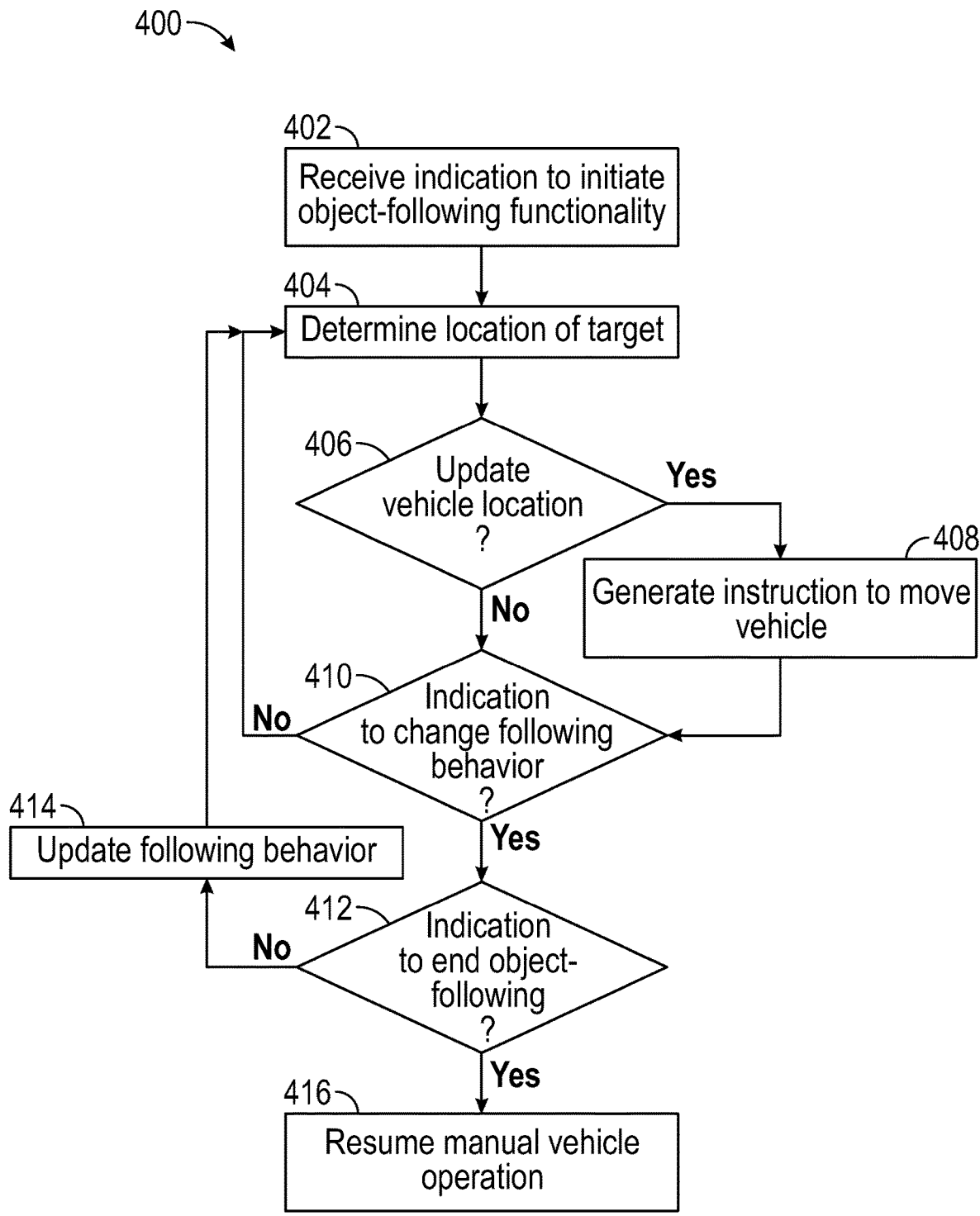
FIG. 10A illustrates an overview of an example method for following an object by a vehicle according to aspects described herein.

FIG. 10A illustrates an overview of an example method 400 for following an object by a vehicle according to aspects described herein. In examples, aspects of method 400 are performed by an automatic movement controller, such as automatic movement controller 175 of vehicle 100 discussed in FIGS. 1-9.

Method 400 begins at operation 402, where an indication to initiate object-following functionality is received. In examples, the indication is received from a removable input device. For example, the indication may be received as a result of a user actuating prime mover activation control 204 of removable input device 200 or switch 254 of removable input device 250, discussed above with respect to FIGS. 7 and 8, respectively. As another example, the indication may be received from an operator device, as may be generated by remote movement application 302 of operator device 300 in FIG. 9. In some instances, the indication may comprise control information, such as an indication as to a target to follow or, as another example, a distance and/or bearing with which to follow the target. As a further example, the indication may specify another vehicle to follow. Thus, it will be appreciated that the target may be a removable input device, an operator device, a target object, or any of a variety of other targets.

Flow progresses to operation 404, where a location of the target is determined. For example, the location of the target may be determined relative to the vehicle (e.g., vehicle 100 in FIGS. 1-9) using one or more object sensors (e.g., object sensors 114). In some instances, an absolute location is determined for the target, which may be compared to an absolute location of the vehicle. For example, GPS data may have been received as part of the indication at operation 402 and/or may be requested or otherwise accessed from the target (e.g., via network 190 in FIG. 9). Accordingly, the target GPS data may be processed in relation to vehicle GPS data. In some instances, operation 404 comprises verifying a determined target location, for example using any of a variety of other types of sensor data, based on one or more machine learning models, and/or using a set of rules, among other examples.

At determination 406, it is determined whether to update the vehicle location. For example, the determination may comprise evaluating the target location (e.g., as was determined at operation 404) to control information (e.g., as was received at operation 402) to determine whether the distance and/or bearing between the vehicle and the target satisfies a distance and/or a bearing specified by the control information. In some instances, the evaluation is performed based on one or more predetermined thresholds. For example, it may be determined not to update the vehicle location if the current distance between the vehicle and the target differs from a specified distance within a predetermined distance threshold. Similarly, it may be determined not to update the vehicle location if the current bearing of the vehicle with respect to the target differs from a specified bearing within a predetermined bearing threshold. While example location determination and evaluation techniques are described, it will be appreciated that any of a variety of other techniques may be used according to aspects described herein.

If it is determined to update the vehicle location, flow branches "YES" to operation 408, where an instruction is generated to move the vehicle. For example, the instruction may comprise an indication to control a power system (e.g., power system 146 in FIG. 9) to cause the vehicle to move a certain distance. Operation 408 may comprise providing an indication to control a steering system (e.g., steering system 144 in FIG. 9) so as to control a direction of travel. Operation 408 may comprise providing an indication to slow the vehicle, as may be provided to a braking/tracking system (e.g., braking/traction system 142 in FIG. 9). Thus, operation 408 may comprise providing indications to any of a variety of controllers, such as controllers 172, 174, 176, and/or 178 in FIG. 9. In some instance, operation 408 comprises providing an indication as to an absolute or relative vehicle location, as may be received by an operator device and used to update an associated display accordingly. Flow then progresses to determination 410, which is discussed in detail below.

If, however, it is instead determined at determination 406 to not update the vehicle location, flow instead branches "NO" to determination 410, where it is determined whether there is an indication to change following behavior. For example, an indication may be received from a removable input device or an operator device, similar to the aspects discussed above with respect to operation 402. The indication may update control information, thereby changing a distance, bearing, and/or target used for object-following functionality.

If it is determined that there has not been an indication to change following behavior, flow branches "NO" and returns to operation 404, where a location of the target is determined as discussed above. Thus, operations 408-410 may form a feedback loop, where the location of the target is determined and evaluated while a vehicle's location is continually updated as needed. Thus, it will be appreciated that operation 408 need not comprise the same instructions and may, in some instances, comprise varying instructions depending on the determined target location and whether it is determined to update the vehicle location. For instance, a first iteration of operation 408 may cause a vehicle to accelerate to a certain speed, a second iteration of operation 408 may cause a vehicle to adjust its steering, while a third iteration of operation 408 may cause a vehicle to brake. As another example, if a target is moving at a substantially consistent speed, subsequent iterations of operation 408 may comprise performing minor throttle and/or steering adjustments.

If, however, it is determined that there has been an indication to change following behavior, flow branches "YES" to determination 412, where it is determined whether the indication is to end object-following functionality. If it is determined that the indication is to end object-following functionality, flow branches "YES" to operation 416, where manual vehicle operation is resumed. For example, a vehicle may be stopped (e.g., as a result of providing an indication to a braking/traction controller and/or power system controller, such as controllers 172 and 176 in FIG. 9, respectively). As another example, an indication may be provided to operate according to operator input rather than automatic input. For instance, if an operator is controlling a throttle at a level below the level that was specified as a result of operation 408, operation 416 may cause the level specified by the operator to be used. Flow terminates at operation 416.

If, however, it is determined not to end object-following functionality, flow instead branches "NO" to operation 414, where the following behavior is updated. Flow then returns to operation 404, where it may loop as discussed above for the duration of automatic vehicle control according to the disclosed object-following functionality. Flow ultimately terminates at operation 416.

Figure 10B:
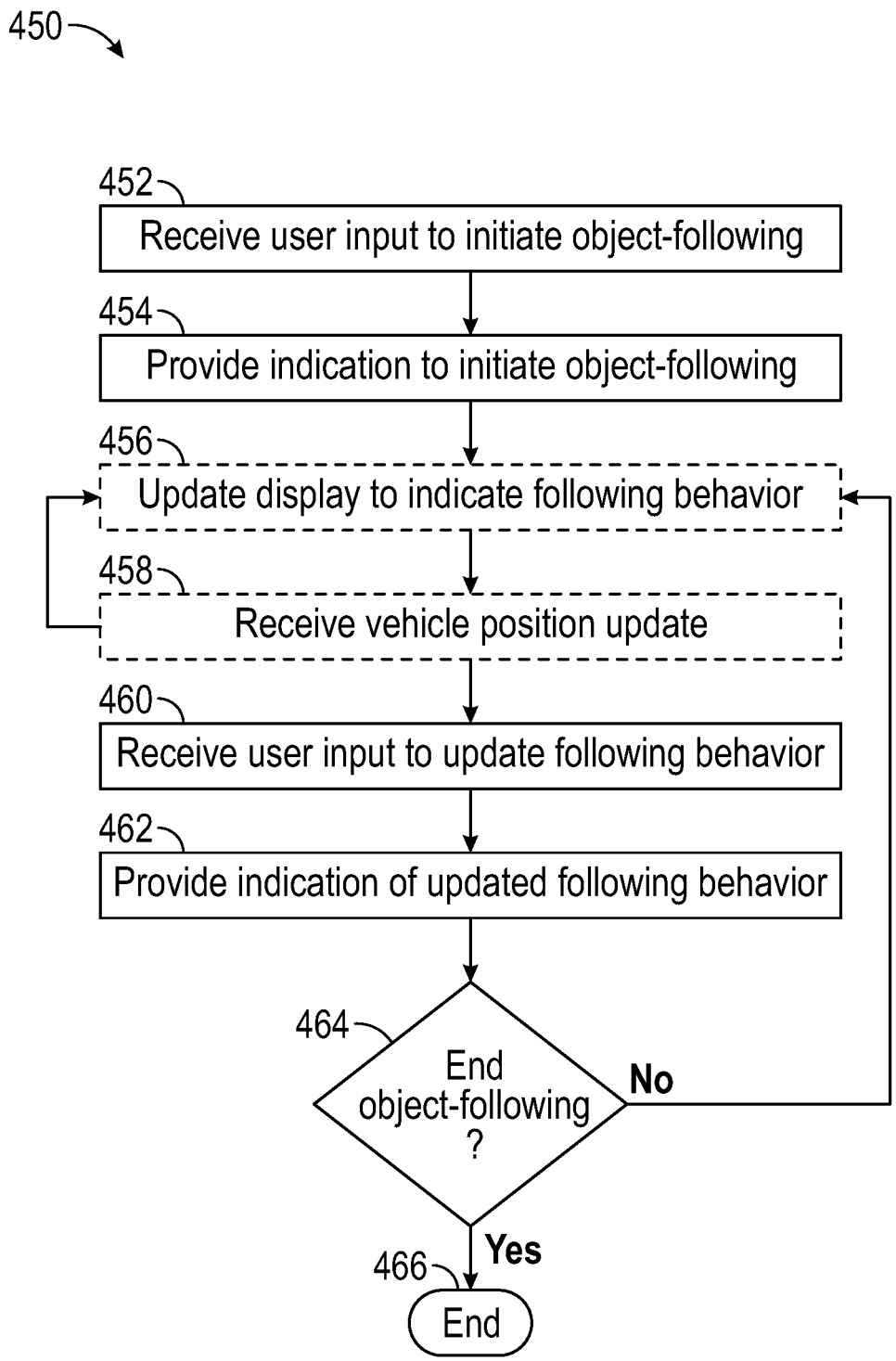
FIG. 10B illustrates an overview of an example method for controlling the following behavior of a vehicle.

FIG. 10B illustrates an overview of an example method 450 for controlling the following behavior of a vehicle. In examples, aspects of method 450 are performed by a removable input device (e.g., removable input device 200 or 250 discussed above with respect to FIGS. 1-9) or an operator device (e.g., operator device 300).

Method 450 begins at operation 452, where a user input to initiate object-following functionality is received. For example, the user input may comprise a user actuating prime mover activation control 204 of removable input device 200 or switch 254 of removable input device 250, discussed above with respect to FIGS. 7 and 8, respectively. As another example, the indication may be received from an operator device, as may be generated by remote movement application 302 of operator device 300 in FIG. 9. In some instances, the user input comprises an indication as to a distance, bearing, and/or target to be followed by the vehicle.

Flow progresses to operation 454, where an indication is provided to initiate object-following functionality. For example, the indication may be communicated to the vehicle over a network (e.g., network 190 in FIG. 9). The indication may comprise control information associated with a distance, bearing, and/or target that was specified by a user, as discussed above.

At operation 456, a display may be updated to indicate that object-following behavior is active. In some instances, the display may comprise a location of the vehicle with respect to a target. In other instances, operation 456 comprises using an indicator, such as a light, to indicate that object-following functionality is active. For example, an indicator of a removable input device (e.g., removable input device 200 or 250 in FIGS. 7 and 8, respectively) may be used.

Flow progresses to operation 458, where a vehicle position update is received. For example, the update may comprise a relative or absolute location of the vehicle, such that flow returns to operation 456 to update the display accordingly. Operations 456 and 458 are illustrated using dashed boxes to indicate that, in some examples, operations 456 and/or 458 may be omitted. For example, the display of a vehicle position may not be updated in some instances or, as another example, a device may not comprise a display or other indicator with which to indicate that object-following behavior is active.

At operation 460, user input is received to update following behavior. For example, the user input may comprise an indication to end object-following functionality or, as another example, an update to a he distance, bearing, and/or target may be received. Accordingly, at operation 462, an indication of the updated following behavior is provided.

At determination 464, it is determined whether the input was to end object-following functionality. If the input was not to end object-following functionality, flow branches "NO" and returns to operation 456 (or, in some instances, operation 460), such that flow may loop while the vehicle is operating under automatic vehicle control according to the disclosed object-following functionality. If, however, the input was to end object-following functionality, flow instead branches "YES" and ends at operation 466.

Figure 11:
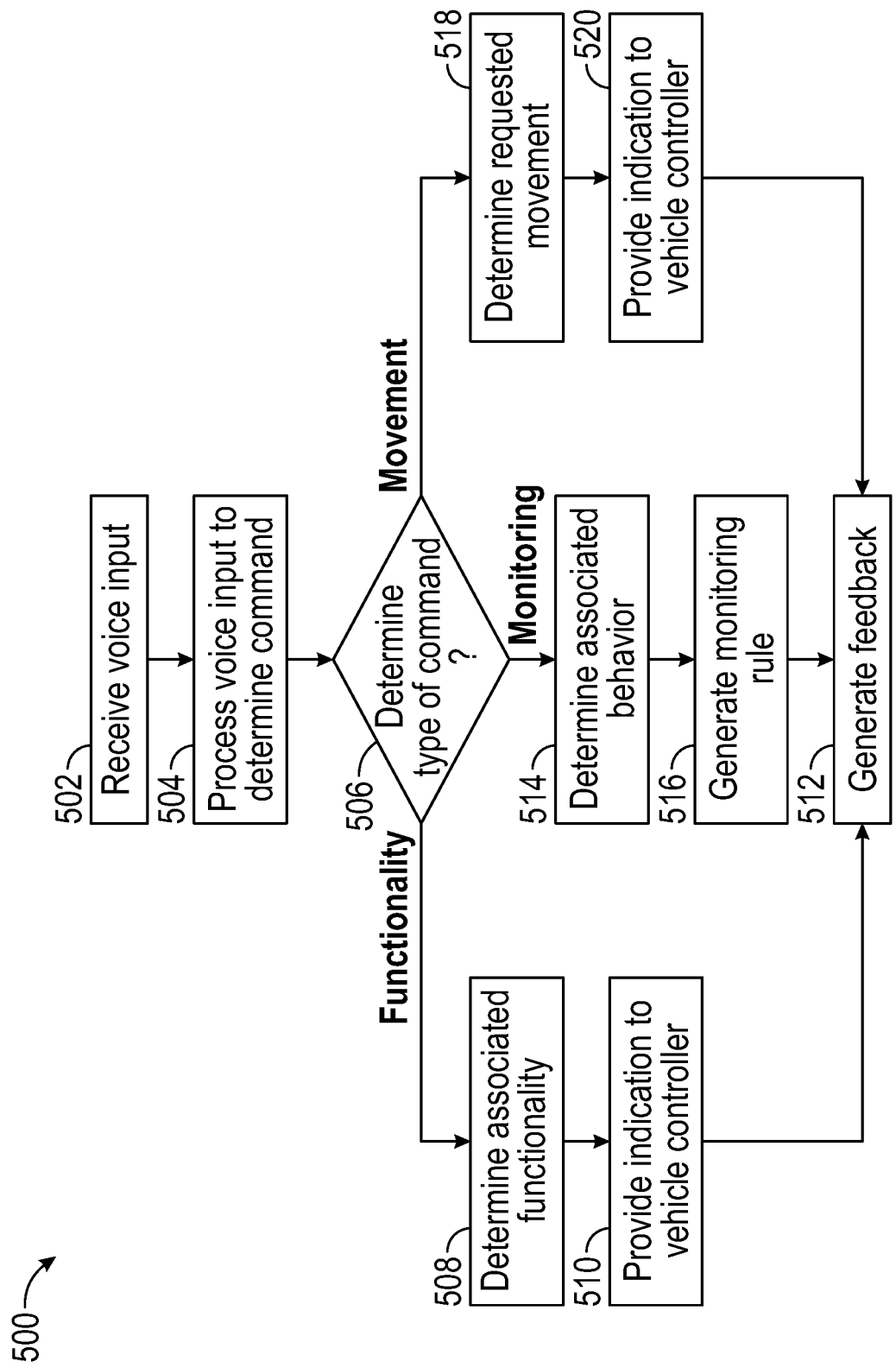
FIG. 11 illustrates an overview of an example method for processing a voice command by a vehicle according to aspects described herein.

FIG. 11 illustrates an overview of an example method 500 for processing a voice command by a vehicle according to aspects described herein. In examples, aspects of method 500 are performed by an automatic movement controller, such as automatic movement controller 175 of vehicle 100 discussed in FIGS. 1-9.

Method 500 begins at operation 502, where voice input is received. For example, voice input may be received from a microphone of a vehicle (e.g., vehicle 100 in FIGS. 1-9), from a removable input device (e.g., removable input device 200 or 250 in FIGS. 7 and 8, respectively), or from an operator device (e.g., operator device 300 in FIG. 9).

At operation 504, the voice input is processed to determine a command associated with the voice input. For example, natural language processing techniques may be applied or the voice input may be transmitted to another computing device for processing. It will be appreciated that, in other examples, operations 502 and 504 may instead comprise receiving a command, such that a voice input has already been processed (e.g., as a skill of a virtual assistant, as discussed above). Further, while examples are described herein with respect to voice input, it will be appreciated that any of a variety of other input types may be processed according to aspects of the present disclosure. For example, text input or video input may be similarly processed.

At determination 506, a type of command is determined. For example, a rule hierarchy may specify operations that can be performed, such that a segment of the hierarchy associated with the command may be identified accordingly. If it is determined that the type of command relates to vehicle functionality, flow branches "FUNCTIONALITY" to operation 508, where an associated functionality is determined. For example, a matching rule associated with the command may be identified within the rule hierarchy, such that an indication may be provided to an appropriate vehicle controller (e.g., controllers 170, 172, 174, 176, and/or 178 in FIG. 9) at operation 510.

If, however, it is determined that the type of command relates to vehicle monitoring, flow instead branches "MONITORING" to operation 514, where a vehicle behavior associated with the command is determined. For example, a matching rule associated with the command may be identified within the rule hierarchy, such that a monitoring rule may be generated at operation 516 accordingly.

If it is instead determined that the type of command relates to vehicle movement, flow instead branches "MOVEMENT" to operation 518, where the requested movement is determined. In some instances, operation 518 comprises identifying an association between a place alias (e.g., home) and a geographic location (e.g., an address, a set of coordinates, and/or a predetermined path of travel). Flow progresses to operation 520, where an indication is provided to an appropriate vehicle controller (e.g., controllers 170, 172, 174, 176, and/or 178 in FIG. 9) at operation 520, thereby causing the vehicle to move according to the requested movement.

Flow ultimately progresses to operation 512 (e.g., either from operation 510, 516, or 520), where feedback is generated. In examples, the feedback comprises an indication that a command was performed successfully or unsuccessfully. In other examples, the feedback comprises an indication as to a monitored behavior or a status with respect to a movement command. While example commands and associated operations are described herein, it will be appreciated that any of a variety of such commands and resulting operations may be used in accordance with the present disclosure. Flow terminates at operation 512.

Figure 12A:
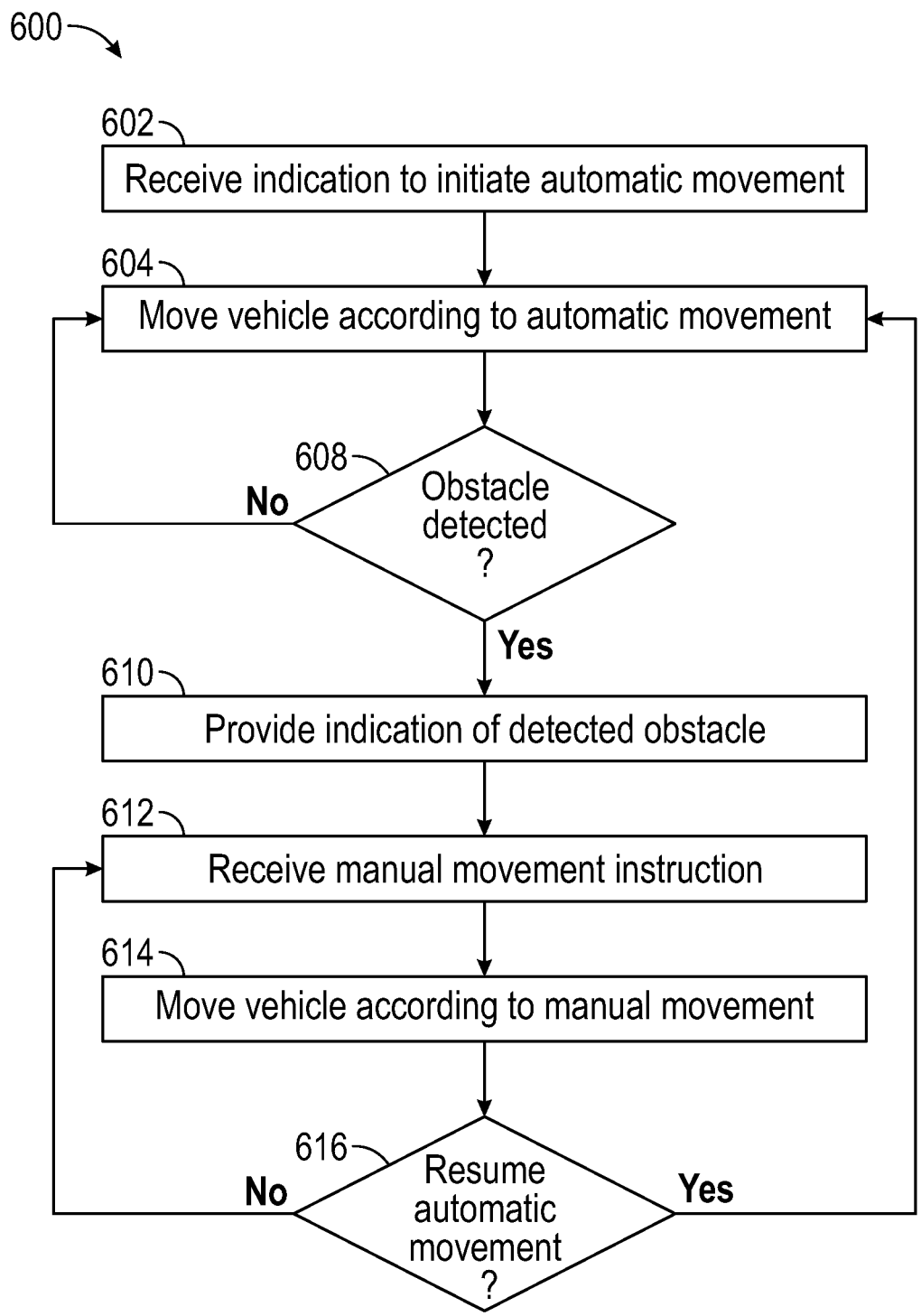
FIG. 12A illustrates an overview of an example method for performing an automatic movement and handling a detected obstacle by a vehicle according to aspects described herein.

FIG. 12A illustrates an overview of an example method 600 for performing an automatic movement and handling a detected obstacle by a vehicle according to aspects described herein. In examples, aspects of method 600 are performed by an automatic movement controller, such as automatic movement controller 175 of vehicle 100 discussed in FIGS. 1-9.

Method 600 begins at operation 602, where an indication to initiate automatic movement is received. For example, the indication may be to initiate object-following functionality (e.g., as discussed above with respect to FIG. 10A) or may be to navigate to a location or according to a predefined path (e.g., as discussed above with respect to FIG. 11).

Flow progresses to operation 604, where the vehicle moves according to the specified automatic movement. For example, aspects of operation 408 and/or 520 in FIGS. 10A and 11, respectively, may be performed.

At determination 608, it is determined whether an obstacle is detected. For example, an obstacle may be detected by one or more object sensors, such as object sensors 114 of vehicle 100 discussed above with respect to FIGS. 1-9. If it is determined that an obstacle has not been detected, flow branches "NO" to operation 604, where automatic vehicle movement continues according to aspects described herein.

If, however, it is determined that an obstacle has been detected, flow instead branches "YES" to operation 610, where an indication of the detected obstacle is provided. In some instances, the indication comprises information associated with the object, such as a distance, size, or image data. The indication may be provided to a removable input device (e.g., removable input device 200 or 250 in FIGS. 7 and 8, respectively) or to an operator device (e.g., operator device 300 in FIG. 9), among other examples.

At operation 612, a manual movement instruction is received. For example, the manual movement instruction may comprise an indication as to a direction of travel and/or a speed with which to travel, among other examples. Accordingly, at operation 614, the vehicle is moved according to the received manual movement instruction. For example, an indication based on the received manual movement instruction may be provided to one or more vehicle controllers (e.g., controllers 170, 172, 174, 176, and/or 178).

At determination 616, it is determined whether to resume automatic movement. For example, the determination may comprise determining that an identified obstacle is no longer obstructing the vehicle, that the vehicle has returned to a predetermined path, and/or that an indication to resume automatic operation has been received. If it is not determined to resume automatic movement, flow branches "NO" to operation 612, where manual control of the vehicle continues as discussed above. However, if it is instead determined to resume automatic movement, flow branches "YES" to operation 604 and proceeds as discussed above.

Figure 12B:
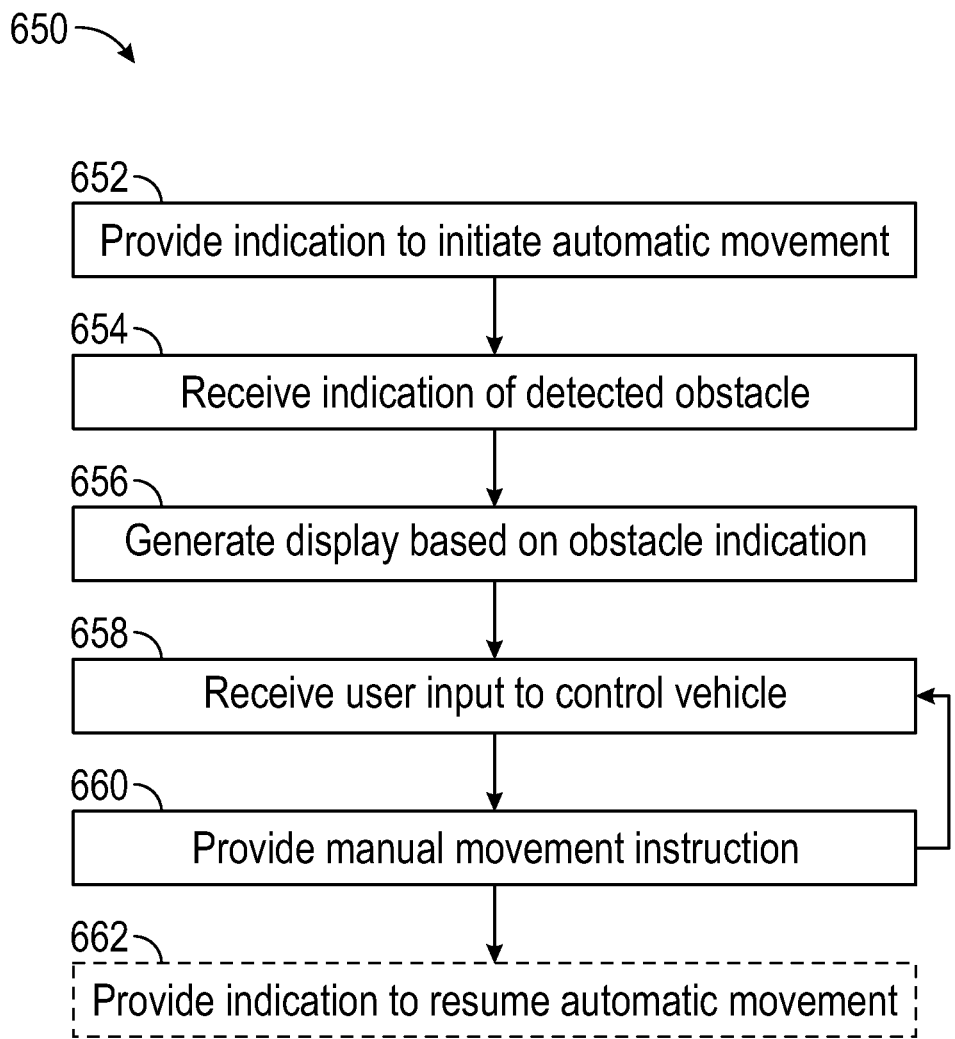
FIG. 12B illustrates an overview of an example method for handling a detected object at a removable input device or an operator device.

FIG. 12B illustrates an overview of an example method 650 for handling a detected object at a removable input device or an operator device. For example, aspects of method 650 are performed by a removable input device (e.g., removable input device 200 or 250 discussed above with respect to FIGS. 1-9) or an operator device (e.g., operator device 300).

Method 650 begins at operation 652, where an indication is provided to initiate automatic movement. For example, operation 652 may comprise performing aspects similar to those of operation 452 discussed above with respect to FIG. 10B or the indication may comprise providing a voice command, among other examples.

Flow progresses to operation 654, where an indication of a detected obstacle is received. The indication may be received as a result of a vehicle performing aspects of operation 610 discussed above with respect to FIG. 12A. In examples, the indication comprises information associated with the obstacle such as a distance, size, or image data. Accordingly, at operation 656, a display associated with the obstacle is generated. For example, the display may comprise obstacle information that was received at operation 656. In some instances, the display comprises a substantially contemporaneous stream of images from the vehicle, thereby allowing an operator to view the environment of the vehicle. In other examples, operation 656 comprises utilizing an indicator, such as a light, a speaker, or a vibrating motor to provide an indication to an operator that an obstacle has been encountered.

At operation 658, user input is received to control the vehicle. For example, the user input may comprise an interaction of a user interface element, as may be displayed by a remote movement application such as remote movement application 302 of operation device 300 in FIG. 9. As another example, the user input may comprise actuation of any of a variety of input controls, as discussed above with respect to removable input device 200 and 250 in FIGS. 7 and 8, respectively. Accordingly, at operation 660, a manual movement instruction is provided. In some instances, the manual movement instruction comprises the received user input (e.g., as may be the case when a removable input device is used), such that the user input may be processed by a vehicle controller of the vehicle (e.g., automatic movement controller 175 in FIG. 9). In other examples, the movement instruction comprises a movement instruction, for example specifying a speed of travel and/or a bearing. Thus, it will be appreciated that any of a variety of manual movement instructions may be used according to aspects described herein. As illustrated, flow may loop between operations 658 and 660 while the obstacle obstructs the vehicle.

Flow may eventually progress to operation 662, where an indication is provided to resume automatic movement. The indication may be provided based on received user input or, as another example, user input may not have been received for a predetermined amount of time, such that manual input control times out and automatic control is returned to the vehicle. Operation 662 is illustrated using a dashed box to indicate that, in other examples, operation 662 may be omitted, as may be the case when the vehicle automatically determines to resume automatic movement. Thus, method 650 terminates at operation 662 or, in other examples, operation 660.

Figure 13:
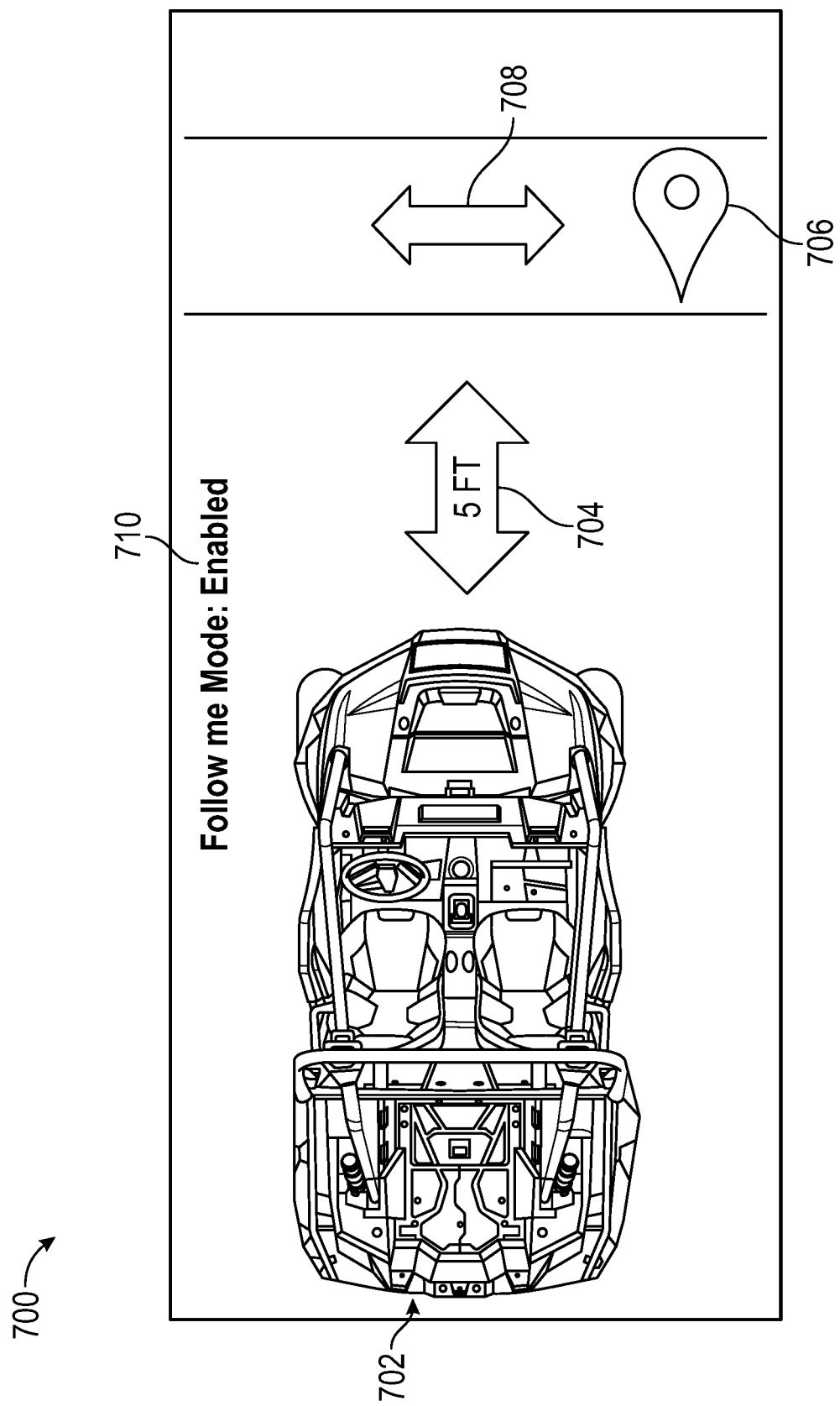
FIG. 13 illustrates an overview of an example user interface for configuring automatic vehicle control according to aspects described herein.

FIG. 13 illustrates an overview of an example user interface 700 for configuring automatic vehicle control according to aspects described herein. For example, user interface 800 may be generated as part of remote movement application 302 of operator device 300 discussed above with respect to FIG. 9.

As illustrated, user interface 400 comprises vehicle element 702, distance indicator 704, target element 706, bearing indicator 708, and operation indicator 710. In examples, vehicle element 702 comprises an indication as to the vehicle currently controlled by the remote movement application (e.g., vehicle 100 discussed above with respect to FIGS. 1-9). As another example, vehicle element 702 may comprise one or more images received from the vehicle (e.g., as may be captured by object sensors 114 of vehicle 100) or may comprise a substantially contemporaneous stream of images from the vehicle, among other examples.

Distance indicator 704 may receive user input to adjust the distance with which a vehicle follows a target (e.g., as represented by target element 706). For example, a user may slide distance indicator 704 to be closer or farther away from target element 706, thereby indicating a shorter or greater following distance, respectively. In other examples, actuating distance indicator 704 may cause the display of a set of options, from which a user may select a distance. As a further example, a user may type a distance or may provide input specifying that the vehicle should maintain its current distance.

Bearing indicator 708 may receive user input to adjust the bearing with which a vehicle follows the target. For example, a user may slide bearing indicator 708 to be closer or farther away from target element 706, thereby indicating a preferred bearing. In other examples, actuating bearing indicator 708 may cause the display of a set of options, from which a user may select a bearing. As a further example, a user may specify a bearing or may provide input specifying that the vehicle should maintain its current bearing in relation to the target. In other instances, target element 706 may be moved (e.g., along the arrow as indicated by bearing indicator 708), thereby changing the bearing with which the vehicle will follow the target. A user may actuate target element 706 to select a target to be followed by the vehicle.

Operation indicator 710 provides an indication as to whether object-following functionality is currently active (e.g., "ENABLED" versus "DISABLED"). In some instances, a user may actuate operation indicator 710 to enable or disable automatic vehicle control or, as another example, object-following functionality may be automatically suspended or disabled according to aspects described herein, such that operation indicator 710 may be updated to reflect that object-following functionality is "DISABLED."

Figure 14:
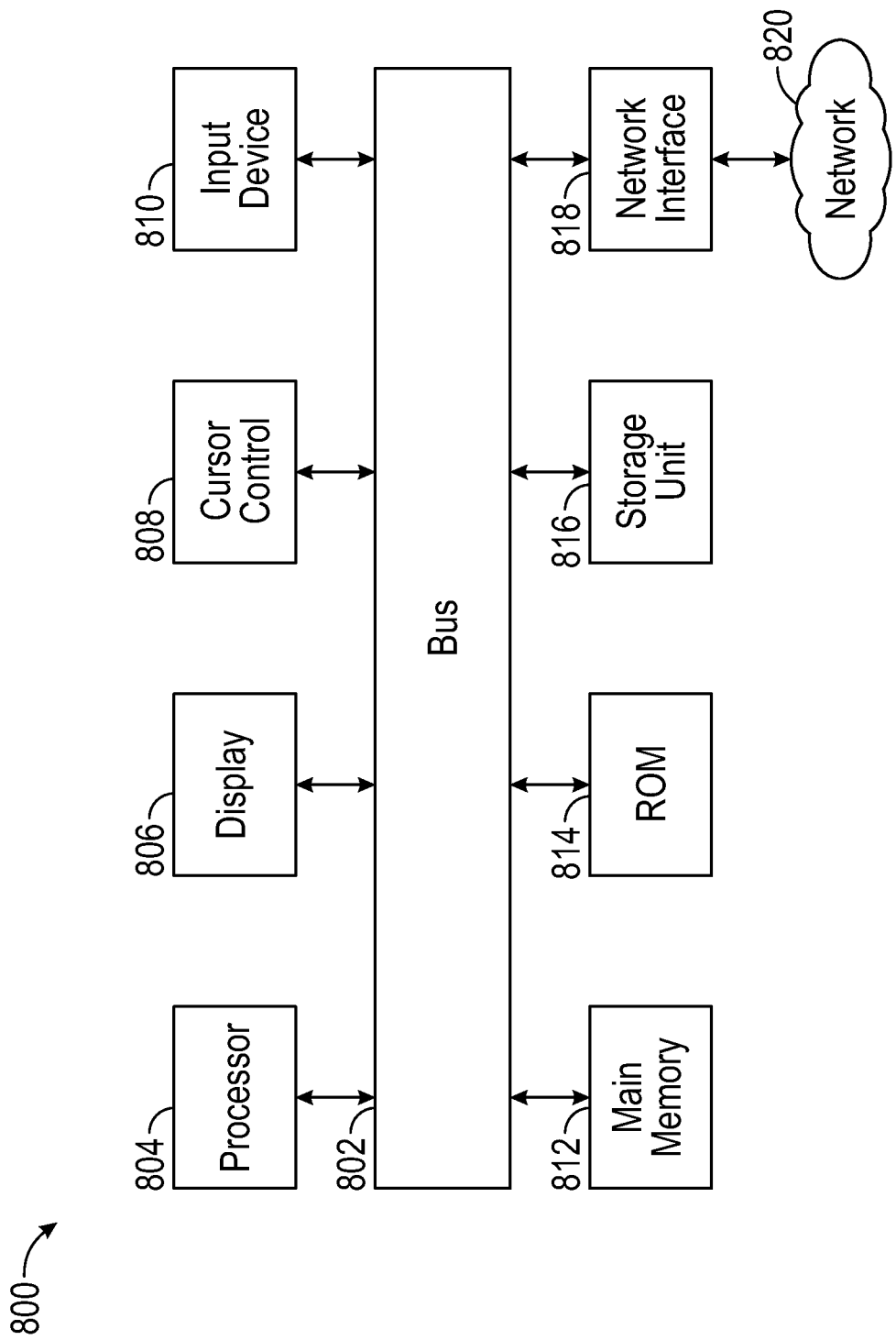
FIG. 14 illustrates a diagram of a computing system for implementing aspects of automatic vehicle control, for example at an operator device.

FIG. 14 illustrates a diagram of a computing system 900 for implementing aspects of automatic vehicle control according to aspects described herein. For example, some or all of the functions of vehicle controller 170, removable input device 200, and/or operation device 300 may be performed by a computing system that has similar components as the computing system 900. This diagram is merely an example, which should not unduly limit the scope of the claims. One of ordinary skill in the art would recognize many variations, alternatives, and modifications.

The computing system 900 includes a bus 902 or other communication mechanism for communicating information between, a processor 904, a display 906, a cursor control component 908, an input device 910, a main memory 912, a read only memory (ROM) 914, a storage unit 916, and/or a network interface 918. In some examples, the bus 902 is coupled to the processor 904, the display 906, the cursor control component 908, the input device 910, the main memory 912, the read only memory (ROM) 914, the storage unit 916, and/or the network interface 918. And, in certain examples, the network interface 918 is coupled to a network 920 (e.g., the network 190 in FIG. 9).

In some examples, the processor 904 includes one or more general purpose microprocessors. In some examples, the main memory 912 (e.g., random access memory (RAM), cache and/or other dynamic storage devices) is configured to store information and instructions to be executed by the processor 904. In certain examples, the main memory 912 is configured to store temporary variables or other intermediate information during execution of instructions to be executed by processor 904. For example, the instructions, when stored in the storage unit 916 accessible to processor 904, render the computing system 900 into a special-purpose machine that is customized to perform the operations specified in the instructions (e.g., the components 172, 174, 175, 176, 178, 222 and/or 302). In some examples, the ROM 914 is configured to store static information and instructions for the processor 904. In certain examples, the storage unit 916 (e.g., a magnetic disk, optical disk, or flash drive) is configured to store information and instructions.

Thus, computing system 900 may include at least some form of computer readable media. The computer readable media may be any available media that can be accessed by processor 904 or other devices. For example, the computer readable media may include computer storage media and communication media. The computer storage media may include volatile and nonvolatile, removable and non-removable media implemented in any method or technology for storage of information such as computer readable instructions, data structures, program modules or other data. The computer storage media may not include communication media.

In some embodiments, the display 906 (e.g., a cathode ray tube (CRT), an LCD display, or a touch screen) is configured to display information to a user of the computing system 900. In some examples, the input device 910 (e.g., alphanumeric and other keys) is configured to communicate information and commands to the processor 904. For example, the cursor control 908 (e.g., a mouse, a trackball, or cursor direction keys) is configured to communicate additional information and commands (e.g., to control cursor movements on the display 906) to the processor 904.

The following clauses are provided as example aspects of the disclosed subject matter:

1. A removable input device for a vehicle, comprising: a housing adapted to be coupled to the vehicle; a beacon; a prime mover activation control; a functionality input control; and a device controller configured to receive user input from the prime mover activation control and the functionality input control, wherein a user input associated with the prime mover activation control is configured to start the vehicle and a user input associated with the functionality input control is configured to control functionality of the vehicle.

2. The removable input device of clause 1, wherein the housing is adapted to be coupled to a shaft of the vehicle, thereby causing the removable input device to be in a coupled mode of operation.

3. The removable input device of any one of clauses 1-2, further comprising a rechargeable battery, wherein the device controller is configured to charge the rechargeable battery when the removable input device is in a coupled mode of operation.

4. The removable input device of any one of clauses 2-3, wherein the prime mover activation control is configured to start the vehicle when the removable input device is in the coupled mode of operation.

5. The removable input device of any one of clauses 2-4, wherein the removable input device has a remote mode of operation.

6. The removable input device of clause 5, wherein the prime mover activation control is configured, when the removable input device is in the remote mode of operation, to initiate an object-following functionality of the vehicle.

7. The removable input device of any one of clauses 1-6, wherein the functionality input control comprises a forward input control and a reverse input control.

8. The removable input device of clause 7, wherein, when the removable input device is in a coupled mode of operation: the forward input control is configured to pull in a winch of the vehicle in response to user actuation; and the reverse input control is configured to let out the winch in response to user actuation.

9. The removable input device of clause 8, wherein the forward input control and the reverse input control are configured to control movement of the vehicle when the remote input device is in a remote mode of operation.

10. The removable input device of any one of clauses 1-9, wherein the functionality input control comprises a joystick input control configured to control movement of the vehicle.

11. A utility vehicle, comprising: a frame; a power source supported by the frame; a bed supported by the frame; an operator area with a first set of controls that is accessible while an operator is seated in the operator area; and a second set of controls separate from the first set of controls that is accessible while the operator is external from the operator area.

12. The utility vehicle of clause 11, wherein the second set of controls is removably supported by the bed and wherein the power source of the vehicle is controlled by the second set of controls using wireless communication to a vehicle controller of the utility vehicle.

13. The utility vehicle of any one of clauses 11-12, wherein the second set of controls comprises a forward input control and a reverse input control.

14. The utility vehicle of any one of clauses 11-13, wherein the second set of controls comprises a joystick input control.

15. A utility vehicle, comprising: a frame; a power source supported by the frame; an object sensor supported by the frame; and a vehicle controller configured to:

receive an indication to initiate object-following functionality of a target; process data from the object sensor to identify the target; and control the power source of the utility vehicle to cause the utility vehicle to follow the identified target according to the received indication.

16. The utility vehicle of clause 16, wherein: the target is a removable input device of the utility vehicle; and the removable input device comprises a beacon detectable by the object sensor; and the removable input device has a coupled mode of operation and a remote mode of operation, wherein the removable input device in the remote mode of operation is configured to provide the indication to initiate object-following functionality of the vehicle controller.

17. The utility vehicle of clause 16, wherein the vehicle controller is further configured to: process data from the object sensor to detect an obstacle; and in response to detecting the obstacle, suspend object-following functionality.

18. The utility vehicle of clause 17, wherein the vehicle controller is further configured to: receive manual input to maneuver the utility vehicle around the detected obstacle; control the power source according to the received manual input; and resume object-following functionality.

19. The utility vehicle of any one of clauses 15-18, wherein the object sensor is one of: a camera; an ultra-wideband radio; or a global positioning system sensor.

20. The utility vehicle of any one of clauses 15-19, wherein: the target is an operator computing device; the indication is received from the operator computing device; and the indication comprises at least one of a distance or a bearing from which to follow the operator computing device.

21. The utility vehicle of any one of clauses 15-20, wherein the vehicle controller is further configured to: detect at least one of a steering input, a brake input, or a throttle input; determine the detected input is above a predetermined threshold; and in response to determining the detected input is above the predetermined threshold, suspend object-following functionality or remote control functionality.

22. A method for automatic control of a vehicle, the method comprising: receiving an indication to initiate object-following functionality of a target; processing data from an object sensor of the vehicle to identify the target; and controlling a power source of the vehicle to cause the vehicle to follow the identified target according to the received indication, thereby providing object-following functionality.

23. The method of clause 22, wherein controlling the power source comprises: generating a distance between the vehicle and the identified target; determining, based on the generated distance, whether to update a location of the vehicle in relation to the identified target; and based on determining to update the location of the vehicle, controlling the power source to cause the vehicle to follow the identified target.

24. The method of any one of clauses 22-23, further comprising: processing data from the object sensor to detect an obstacle; and in response to detecting the obstacle, suspending the object-following functionality.

25. The method of clause 24, further comprising: receiving an indication of manual input to maneuver the vehicle around the detected obstacle; control the power source of the vehicle according to the received indication; and resuming the object-following functionality.

26. The method of any one of clauses 22-25, further comprising: detecting at least one of a steering input, a brake input, or a throttle input; determining the detected input is above a predetermined threshold; and in response to determining the detected input is above the predetermined threshold; suspending object-following functionality or remote control functionality.

27. The method of any one of clauses 22-26, wherein the object sensor of the vehicle is one of: a camera; an ultra-wideband radio; or a global positioning system sensor.

28. The method of any one of clauses 22-27, wherein the target is one of: an operator computing device; a removable input device of the vehicle; or a target object detectable by the object sensor.

29. A method for managing a vehicle under automatic control, the method comprising: receiving a user input to initiate automatic vehicle control; providing, to a vehicle controller of the vehicle, an indication to initiate automatic vehicle control; receiving, from the vehicle controller, an indication of a detected obstacle; updating a display to indicate the vehicle has encountered the detected obstacle; receiving user input comprising a manual movement for the vehicle; and providing, to the vehicle controller, an indication of the manual movement for the vehicle.

30. The method of clause 29, wherein the automatic vehicle control comprises object-following functionality to follow a target and the method further comprises: receiving a user input to change at least one of a distance or a bearing between the vehicle and the target; and providing, to the vehicle controller, an indication to update the distance or the bearing.

While this invention has been described as having an example design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A removable input device for a vehicle, comprising:
a housing adapted to be coupled to the vehicle;
a beacon;
a prime mover activation control;
a functionality input control; and
a device controller configured to receive user input from the prime mover activation control and the functionality input control, wherein the device controller includes a plurality of operation modes comprising a remote mode of operation and a coupled mode of operation, wherein the device controller is configured to:
determine a current operating mode for the removable input device;
when the current operating mode is the coupled mode of operation:
process a user input associated with the prime mover activation control as an indication to start the vehicle; and
process a user input associated with the functionality input control as an indication to control functionality of the vehicle; and
when the current operating mode is the remote mode of operation:
process a user input associated with the prime mover activation control as an indication to initiate an object-following functionality of the vehicle, thereby processing user input to the prime mover activation control differently depending on the current operating mode of the removable input device.

2. The removable input device of claim 1, wherein the functionality input control comprises at least one of:
a forward input control and a reverse input control; or
a joystick input control configured to control movement of the vehicle.

3. The removable input device of claim 2, wherein, when the removable input device is in a coupled mode of operation:
the forward input control is configured to pull in a winch of the vehicle in response to user actuation; and
the reverse input control is configured to let out the winch in response to user actuation.

4. The removable input device of claim 3, wherein the forward input control and the reverse input control are configured to control movement of the vehicle when the remote input device is in a remote mode of operation.

5. The removable input device of claim 1, wherein the housing is adapted to be coupled to a shaft of the vehicle, thereby causing the removable input device to be in the coupled mode of operation.

6. The removable input device of claim 5, wherein the removable input device transitions to the remote mode of operation in response to removal from the shaft of the vehicle.

7. The removable input device of claim 6, wherein the removable input device transitions from the remote mode of operation to the coupled mode of operation in response to being coupled to the shaft of the vehicle.

8. The removable input device of claim 1, further comprising a rechargeable battery, wherein the device controller is configured to charge the rechargeable battery when in the coupled mode of operation.

9. The removable input device of claim 1, wherein the removable input device is one of a gear shift input control or a brake input control of the vehicle.

10. A utility vehicle, comprising:
a frame;
a prime mover supported by the frame;
a bed supported by the frame;
an operator area with a first set of controls that is configured to control the prime mover, wherein the first set of controls is accessible while an operator is seated in the operator area; and
a second set of controls that removably couples to a feature formed on the bed of the utility vehicle that is configured to control the prime mover, wherein the second set of controls comprises a forward input control and a reverse input control, thereby enabling operator control of the prime mover when the operator is external from the operator area.

11. The utility vehicle of claim 10, wherein the second set of controls further comprises a joystick input control.

12. The utility vehicle of claim 11, wherein the joystick input control is configured to control a direction of the utility vehicle.

13. The utility vehicle of claim 10, wherein the prime mover of the vehicle is controlled by the second set of controls using wireless communication to a vehicle controller of the utility vehicle.

14. The utility vehicle of claim 13, wherein the second set of controls is configured to wireless communicate with the vehicle controller when uncoupled from the feature formed on the bed of the utility vehicle.

15. The utility vehicle of claim 10, wherein the first set of controls comprises one or more of:
a steering wheel;
a parking brake input control;
a foot pedal; or
a gear shift input control.

16. A method for automatic control of a vehicle, the method comprising:
receiving an indication to initiate object-following functionality of a target;
processing data from an object sensor of the vehicle to identify the target;
controlling a power source of the vehicle to cause the vehicle to follow the identified target according to the received indication, thereby providing object-following functionality, wherein controlling the power source comprises:
generating a distance, in a direction of travel of the vehicle, between the vehicle and the identified target;
determining, based on the generated distance, whether to update a location of the vehicle in relation to the identified target; and
based on determining to update the location of the vehicle, controlling the power source to cause the vehicle to follow the identified target, thereby decreasing the distance between the vehicle and the identified target in the direction of travel;
processing data from the object sensor to detect an obstacle; and
in response to detecting an obstacle:

suspending the object-following functionality:
  receiving manual input to maneuver the vehicle around the detected obstacle; and
  after maneuvering around the obstacle, resuming the object-following functionality.

17. The method of claim 16, further comprising:
detecting at least one of a steering input, a brake input, or a throttle input;
determining the detected input is above a predetermined threshold; and
in response to determining the detected input is above the predetermined threshold;
suspending object-following functionality or remote control functionality.

18. The method of claim 16, wherein the object sensor of the vehicle is one of:
a camera;
an ultra-wideband radio; or
a global positioning system sensor.

19. The method of claim 16, wherein the target is one of:
an operator computing device;
a removable input device of the vehicle; or
a target object detectable by the object sensor.

20. The method of claim 16, wherein object-following functionality is resumed in response to determining the detected obstacle is no longer obstructing the vehicle.

* * * * *